US008428510B2

(12) United States Patent
Stratford et al.

(10) Patent No.: US 8,428,510 B2
(45) Date of Patent: Apr. 23, 2013

(54) AUTOMATIC GAIN CONTROL CONFIGURATION FOR A WIDEBAND DISTRIBUTED ANTENNA SYSTEM

(75) Inventors: Scott Stratford, Campbell, CA (US); David Hart, Sunnyvale, CA (US); David Hansen, Sunnyvale, CA (US)

(73) Assignee: ADC Telecommunications, Inc., Shakopee, MN (US)

( * ) Notice: Subject to any disclaimer, the term of this patent is extended or adjusted under 35 U.S.C. 154(b) by 435 days.

(21) Appl. No.: 12/731,740

(22) Filed: Mar. 25, 2010

(65) Prior Publication Data

US 2011/0237182 A1    Sep. 29, 2011

(51) Int. Cl.
*H04B 3/36* (2006.01)
*H04B 7/14* (2006.01)

(52) U.S. Cl.
USPC ............................................................ 455/7

(58) Field of Classification Search ........................ 455/7
See application file for complete search history.

(56) References Cited

U.S. PATENT DOCUMENTS

| | | | |
|---|---|---|---|
| 5,603,080 A | 2/1997 | Kallander et al. | |
| 5,765,099 A | 6/1998 | Georges et al. | |
| 5,768,312 A * | 6/1998 | Imamura | 375/228 |
| 5,774,789 A | 6/1998 | Van der Kaay et al. | |
| 5,883,882 A | 3/1999 | Schwartz | |
| 5,930,682 A | 7/1999 | Schwartz et al. | |
| 5,983,070 A | 11/1999 | Georges et al. | |
| 6,005,884 A | 12/1999 | Cook et al. | |
| 6,014,546 A | 1/2000 | Georges et al. | |
| 6,157,810 A | 12/2000 | Georges et al. | |
| 6,192,216 B1 | 2/2001 | Sabat, Jr. et al. | |
| 6,353,600 B1 | 3/2002 | Schwartz et al. | |
| 6,480,702 B1 | 11/2002 | Sabat, Jr. | |
| 6,556,551 B1 | 4/2003 | Schwartz | |
| 6,594,496 B2 | 7/2003 | Schwartz | |
| 6,771,933 B1 | 8/2004 | Eng et al. | |
| 6,785,558 B1 | 8/2004 | Stratford et al. | |
| 6,801,767 B1 | 10/2004 | Schwartz | |
| 2004/0110534 A1 | 6/2004 | Chung et al. | |
| 2007/0008939 A1 | 1/2007 | Fischer | |
| 2007/0109180 A1 * | 5/2007 | Charpentier et al. | 342/174 |
| 2008/0174502 A1 | 7/2008 | Oren et al. | |
| 2008/0175175 A1 | 7/2008 | Oren et al. | |
| 2009/0238573 A1 | 9/2009 | Bauman | |
| 2010/0304699 A1 * | 12/2010 | Walker et al. | 455/226.3 |

OTHER PUBLICATIONS

International Searching Authority, "International Search Report", Mailed Nov. 14, 2010, Published in: WO.
International Preliminary Examining Authority, "International Preliminary Report on Patentability", "from Foreign Counterpart of U.S. Appl. No. 12/731,740", Oct. 4, 2012, pp. 1-6, Published in: WO.

* cited by examiner

*Primary Examiner* — Bobbak Safaipour
(74) *Attorney, Agent, or Firm* — Fogg & Powers LLC

(57) ABSTRACT

One embodiment is directed to a distributed antenna system in which a setting for automatic gain control functionality in at least one unit included in the system (for example, in a hub unit or a remote unit) is determined by interpolating between two detected levels measured at that unit while the automatic gain control functionality is operating in two respective predetermined configurations and by interpolating between two target levels that are associated with the two respective predetermined configurations. In one example, the intersection of the two resulting interpolations is used to determine the setting for the automatic gain control functionality.

24 Claims, 18 Drawing Sheets

SHORT PATH

| LOSS 812 | DA 804 | SLOPE 806 | PILOT TARGET 808 810 | | GAIN OFFSETS 814 | | | | | | | |
|---|---|---|---|---|---|---|---|---|---|---|---|---|
| | | | | | B1 | B2 | B3 | B4 | B5 | B6 | B7 | B8 |
| | | | | | | | | | | | | |
| | | | | | | | | | | | | |
| | | | | | | | | | | | | |
| | | | | | | | | | | | | |
| | | | | | | | | | | | | |

MEDIUM PATH

| LOSS 812 | DA 804 | SLOPE 806 | PILOT TARGET 808 810 | | GAIN OFFSETS 814 | | | | | | | |
|---|---|---|---|---|---|---|---|---|---|---|---|---|
| | | | | | B1 | B2 | B3 | B4 | B5 | B6 | B7 | B8 |
| | | | | | | | | | | | | |
| | | | | | | | | | | | | |
| | | | | | | | | | | | | |
| | | | | | | | | | | | | |
| | | | | | | | | | | | | |

LONG PATH

| LOSS 812 | DA 804 | SLOPE 806 | PILOT TARGET 808 810 | | GAIN OFFSETS 814 | | | | | | | |
|---|---|---|---|---|---|---|---|---|---|---|---|---|
| | | | | | B1 | B2 | B3 | B4 | B5 | B6 | B7 | B8 |
| | | | | | | | | | | | | |
| | | | | | | | | | | | | |
| | | | | | | | | | | | | |
| | | | | | | | | | | | | |
| | | | | | | | | | | | | |

|  |  | Slope Table | | | | | Pilot Delta | |
|---|---|---|---|---|---|---|---|---|
|  |  | Length (m) | AGC DA | Slope (decimal) | Lo Pilot (counts) | Hi Pilot (counts) | Gain Offset (band 1) | from Table | Detected |
| 1 | Short | -59.1 | 52 | 19 | 269 | 370 | 0.0 | 101 | 0 |
| 2 |  | -41.1 | 42 | 50 | 281 | 373 | -0.5 | 92 | 1 |
| 3 |  | -14.3 | 32 | 81 | 290 | 377 | -0.7 | 87 | 4 |
| 4 |  | 3.0 | 26 | 112 | 283 | 370 | -0.5 | 87 | 9 |
| 5 |  | 15.1 | 22 | 143 | 279 | 368 | -0.2 | 89 | 17 |
| 6 | Medium | -2.0 | 37 | 19 | 280 | 371 | -0.6 | 91 | 9 |
| 7 |  | 11.0 | 30 | 43 | 291 | 371 | -1.0 | 80 | 24 |
| 8 |  | 34.1 | 21 | 67 | 302 | 375 | -1.3 | 73 | 51 |
| 9 |  | 52.0 | 14 | 91 | 301 | 371 | -1.3 | 70 | 101 |
| 10 |  | 65.2 | 10 | 115 | 295 | 365 | -1.1 | 70 |  |
| 11 | Long | 49.7 | 50 | 18 | 290 | 369 | -0.6 | 79 |  |
| 12 |  | 58.3 | 45 | 40 | 299 | 376 | -0.9 | 77 |  |
| 13 |  | 79.6 | 36 | 62 | 307 | 373 | -1.3 | 66 |  |
| 14 |  | 97.7 | 29 | 84 | 314 | 374 | -1.3 | 60 |  |
| 15 |  | 115.3 | 24 | 106 | 315 | 365 | -1.4 | 50 |  |

FIG. 11

AUTOMATIC GAIN CONTROL CONFIGURATION FOR A WIDEBAND DISTRIBUTED ANTENNA SYSTEM

BACKGROUND

One way that a wireless cellular service provider can improve the coverage provided by a given base station or group of base stations is by using a distributed antenna system (DAS). In a DAS, radio frequency (RF) signals are communicated between a hub unit and one or more remote antenna units (RAUs). The hub unit can be communicatively coupled to one or more base stations directly by connecting the hub unit to the base station using, for example, coaxial cabling. The hub unit can also be communicatively coupled to one or more base stations wirelessly, for example, using a donor antenna and a bi-directional amplifier (BDA).

RF signals transmitted from the base station (also referred to here as "downlink RF signals") are received at the hub unit. The hub unit uses the downlink RF signals to generate a downlink transport signal that is distributed to one or more of the RAUs. Each such RAU receives the downlink transport signal and reconstructs the downlink RF signals based on the downlink transport signal and causes the reconstructed downlink RF signals to be radiated from at least one antenna coupled to or included in that RAU. A similar process is performed in the uplink direction. RF signals transmitted from mobile units (also referred to here as "uplink RF signals") are received at each RAU. Each RAU uses the uplink RF signals to generate an uplink transport signal that is transmitted from the RAU to the hub unit. The hub unit receives and combines the uplink transport signals transmitted from the RAUs. The hub unit reconstructs the uplink RF signals received at the RAUs and communicates the reconstructed uplink RF signals to the base station. In this way, the coverage of the base station can be expanded using the DAS.

One or more intermediate devices (also referred to here as "expansion hubs" or "expansion units") can be placed between the hub unit and the remote antenna units in order to increase the number of RAUs that a single hub unit can feed and/or to increase the hub-unit-to-RAU distance.

Some DAS systems incorporate automatic gain control functionality to automatically adjust the gain and slope of the RF signals. In systems that support only one or two bi-directional RF bands (each RF band including a respective downlink RF band and respective uplink RF band), such automatic gain control is performed on each RF band separately. However, in systems that support a relatively large number of RF bands (for example, eight RF bands), performing automatic gain control on a band-by-band basis can increase the cost and complexity of the DAS system significantly.

SUMMARY

One embodiment is directed to a distributed antenna system in which a setting for automatic gain control functionality in at least one unit included in the system (for example, in a hub unit or a remote unit) is determined by interpolating between two detected levels measured at that unit while the automatic gain control functionality is operating in two respective predetermined configurations and by interpolating between two target levels that are associated with the two respective predetermined configurations. In one example, the intersection of the two resulting interpolations is used to determine the setting for the automatic gain control functionality.

The details of various embodiments of the claimed invention are set forth in the accompanying drawings and the description below. Other features and advantages will become apparent from the description, the drawings, and the claims.

DRAWINGS

FIG. 11 shows an example of a table that can be used with the method of FIGS. 9A-9B.

Like reference numbers and designations in the various drawings indicate like elements.

DETAILED DESCRIPTION

Figure 1:
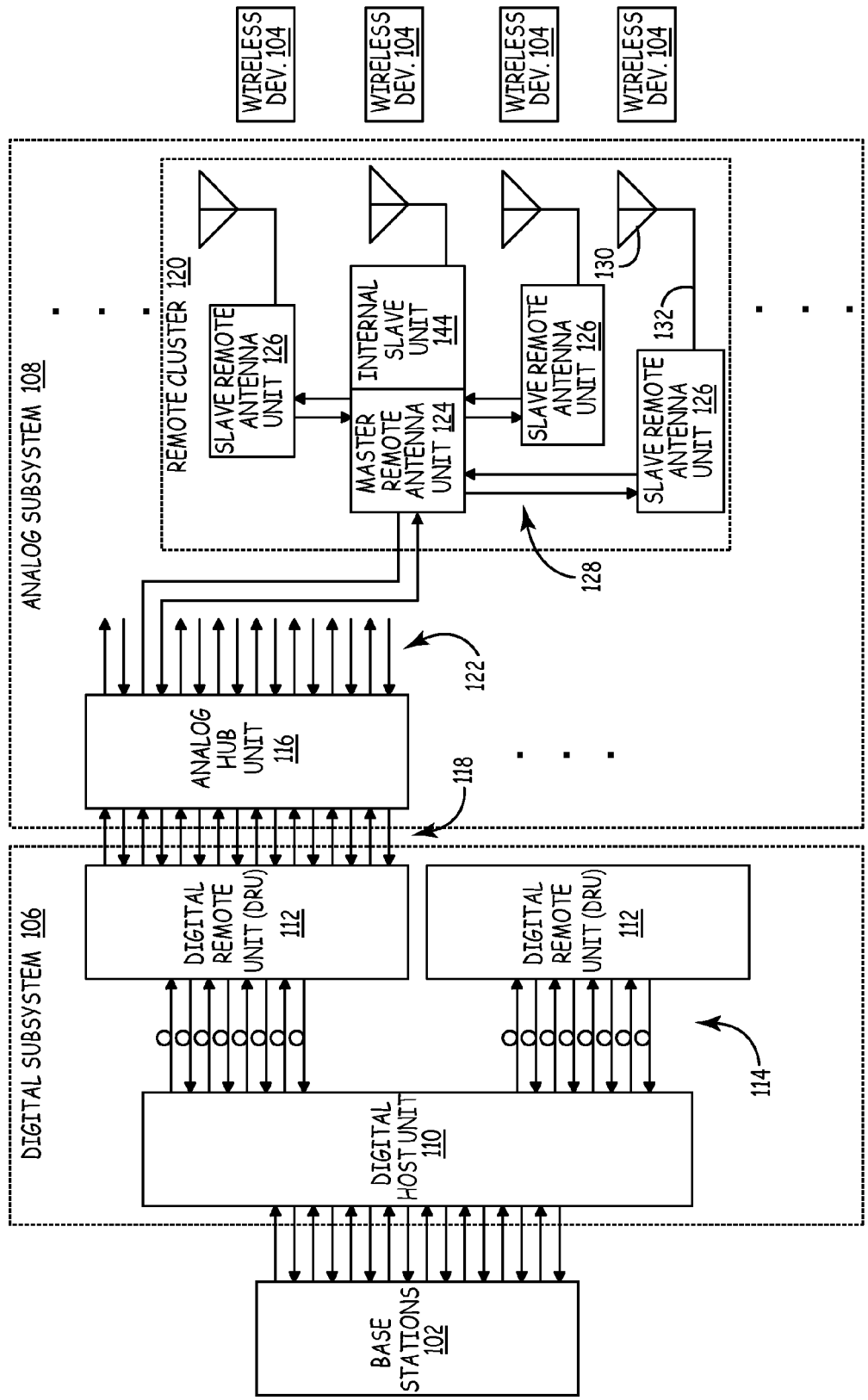
FIG. 1 is a block diagram of one exemplary embodiment of a hybrid digital-analog distributed antenna system.

FIG. 1 is a block diagram of one exemplary embodiment of a hybrid digital-analog distributed antenna system (DAS) 100 in which the automatic gain control (AGC) configuration techniques described here can be implemented. Although the AGC configuration techniques described here are described in connection with the hybrid digital-analog DAS 100 shown in FIG. 1, it is to be understood that the AGC configuration techniques described here can be used in other DAS, repeater, or distributed base station products and systems (for example, a "pure" analog DAS).

The DAS 100 is used to distribute bi-directional wireless communications between one or more base stations 102 and one or more wireless devices 104 (such as mobile wireless devices such as mobile telephones, mobile computers, and/or combinations thereof such as personal digital assistants (PDAs) and smartphones). In the exemplary embodiment shown in FIG. 1, the DAS 100 is used to distribute a plurality of bi-directional radio frequency bands. Each radio frequency band is typically used to communicate multiple logical bi-directional RF channels.

The techniques described here are especially useful in connection with the distribution of wireless communications that use licensed radio frequency spectrum, such as cellular radio frequency communications. Examples of such cellular RF communications include cellular communications that support one or more of the second generation, third generation, and fourth generation Global System for Mobile communication (GSM) family of telephony and data specifications and standards, one or more of the second generation, third generation, and fourth generation Code Division Multiple Access (CDMA) family of telephony and data specifications and standards, and/or the WIMAX family of specification and standards. In the particular exemplary embodiment described here in connection with FIG. 1, the DAS 100 is configured to handle eight cellular bi-directional radio frequency bands. In other embodiments, the DAS 100, and AGC techniques described here, are also used with wireless communications that make use of unlicensed radio frequency spectrum such as wireless local area networking communications that support one or more of the IEEE 802.11 family of standards.

In the particular exemplary embodiment described here in connection with FIG. 1, the DAS 100 is configured to distribute wireless communications that use frequency division duplexing to implement logical bi-directional RF channels. In other embodiments, the DAS 100 is configured to communicate at least some wireless communications that use other duplexing techniques (such as time division duplexing, which is used, for example, in some WIMAX implementations).

Each of the bi-directional radio frequency bands distributed by the DAS 100 includes a separate radio frequency band for each of two directions of communications. One direction of communication goes from the base station 102 to a wireless device 104 and is referred to here as the "downstream" or "downlink" direction. The other direction of communication goes from the wireless device 104 to the base station 102 and is referred to here as the "upstream" or "uplink" direction. Each of the distributed bi-directional radio frequency bands includes a "downstream" band in which downstream RF channels are communicated for that bidirectional radio frequency band and an "upstream" band in which upstream RF channels are communicated for that bidirectional radio frequency band.

In the particular exemplary embodiment shown in FIG. 1, the DAS 100 includes a digital subsystem 106 and an analog subsystem 108. The digital subsystem 106 comprises a digital host unit 110 and one or more digital remote units (DRUs) 112. The digital host unit 110 is communicatively coupled to the one or more base stations 102 either directly (for example, via one or more coaxial cable connections) or indirectly (for example, via one or more donor antennas and one or more bidirectional amplifiers). In the particular exemplary embodiment shown in FIG. 1, the digital host unit 110 can be communicatively coupled to up to eight digital remote units 112.

In the particular exemplary embodiment shown in FIG. 1, the digital host unit 110 is communicatively coupled to each digital remote unit 112 using four pairs of optical fibers 114. The eight bi-directional radio frequency bands are communicated between the digital host unit 110 and the digital remote unit 112 using one or more fiber pairs. The number of fiber pairs that are used depends on factors such as the bandwidth requirements for all frequencies. In the particular exemplary embodiment shown in FIG. 1, eight fiber pairs are used. One of the fibers 114 in each fiber pair is used to communicate downstream data from the digital host unit 110 to the digital remote unit 112 (and is also referred to here as the "downstream" fiber 114), and the other fiber 114 in each fiber pair is used to communicate upstream data from the digital remote unit 112 to the digital host unit 110 (and is also referred to here as the "upstream" fiber 114).

Also, in the particular exemplary embodiment shown in FIG. 1, each digital remote unit 112 is communicatively coupled to a respective analog hub unit 116 of the analog subsystem 108. Each digital remote unit 112 is communicatively coupled to a respective analog hub unit 116 using up to eight pairs of coaxial cable 118 (such as 50 Ohm coaxial cable). Each of the pairs of coaxial cable 118 is used to communicate an intermediate frequency (IF) version of one of the eight bi-directional radio frequency bands distributed by the DAS 100. One of the coaxial cables 118 in each cable pair is used to communicate downstream signals from the digital remote unit 112 to the analog hub unit 116 (and is also referred to here as the "downstream" coaxial cable 118), and the other coaxial cable 118 in each cable pair is used to communicate upstream signals from the analog hub unit 116 to the digital remote unit 112 (and is also referred to here as the "upstream" coaxial cable 118).

In the particular exemplary embodiment shown in FIG. 1, the analog subsystem 108, in addition to the analog hub unit 116, also includes up to eight remote clusters 120.

Each analog hub unit 116 is communicatively coupled to each of the analog remote clusters 120 via a respective pair of coaxial cables 122 (such as 75 Ohm coaxial cable). Each of the pairs of coaxial cable 122 is used to communicate intermediate frequency (IF) versions of all eight of the bi-directional radio frequency bands distributed by the DAS 100. The signals that are communicated between the analog hub unit 116 and the remote clusters 120 are also referred to here as "transport signals". One of the coaxial cables 122 in each cable pair is used to communicate downstream signals from the analog hub unit 116 to the analog remote cluster 120 (and is also referred to here as the "downstream" coaxial 122), and the other coaxial cable 122 in each cable pair is used to communicate upstream signals from the analog remote cluster 120 to the analog hub unit 116 (and is also referred to here as the "upstream" cable 122).

Each analog remote cluster 120 comprises a master remote antenna unit 124 that is directly connected to the analog hub unit 116 via the pair of coaxial cables 122. Each analog remote cluster 120, in the exemplary embodiment shown in FIG. 1, also includes up to three slave remote antenna units 126. Each master remote antenna unit 124 is communicatively coupled to each of the slave remote antenna units 126 over a respective pair of coaxial cables 128 (such as 75 Ohm coaxial cable). Each of the pairs of coaxial cable 128 is used to communicate intermediate frequency (IF) versions of the bi-directional radio frequency bands distributed by the DAS 100. One of the coaxial cables 128 in each cable pair is used to communicate downstream signals from the master remote antenna unit 124 to the slave remote antenna unit 126 (and is also referred to here as the "downstream" coaxial 128), and the other coaxial cable 128 in each cable pair is used to communicate upstream signals from the slave remote antenna unit 126 to the master remote antenna unit 124 (and is also referred to here as the "upstream" cable 128).

Each master remote antenna 124 also includes an internal slave unit 144. Each of internal slave unit 144 and the three slave remote antenna units 126 is communicatively coupled to a respective antenna 130 over a respective coaxial cable 132 (such as a 50 Ohm coaxial cable).

For each of the bi-directional radio frequency bands distributed by the DAS 100, the digital host unit 110 receives downstream radio frequency signals for that bi-directional radio frequency band from the base station 102 and band-pass filters the relevant downstream radio frequency band. The digital host unit 110 down-converts the downstream radio frequency band for each bi-directional radio frequency band to an intermediate frequency version of the downstream radio frequency band and digitizes the resulting intermediate frequency version. In other words, the digital host unit 110, for each of the bi-directional radio frequency bands distributed by the DAS 100, generates digital samples of that respective downstream frequency band.

For each of the downstream fibers 114, the digital host unit 110 frames together digital samples for one or more downstream frequency bands (along with overhead data such as, for example, synchronization data and gain control data) and communicates the resulting frames to each of the digital remote units 112 over that downstream fiber 114.

For each downstream fiber 114, each digital remote unit 112 receives the downstream frames from that downstream fiber 114 and removes the digital samples for the respective one or more downstream frequency bands associated with that downstream fiber 114. The digital remote unit 112 uses a digital-to-analog process to recreate each of the analog downstream intermediate frequency versions of the downstream frequency bands that were digitized in the digital host unit 110 (using the associated overhead data to, for example, synchronize the digital samples and adjust the gain of the IF signals).

The digital remote unit 112 communicates the resulting downstream intermediate frequency versions of all of the downstream frequency bands to the analog hub unit 116. Each of the resulting downstream intermediate frequency versions of the downstream frequency bands is communicated to the analog hub unit 116 over a respective downstream coaxial cable 118.

Each analog hub unit 116 combines the downstream intermediate frequency versions of all of the downstream frequency bands in order to create a set of adjacent but non-overlapping intermediate frequency bands. The set of adjacent but non-overlapping downstream intermediate frequency bands is also referred to here collectively as the "downstream wide band" or the "downstream wide band signals".

Figure 2:
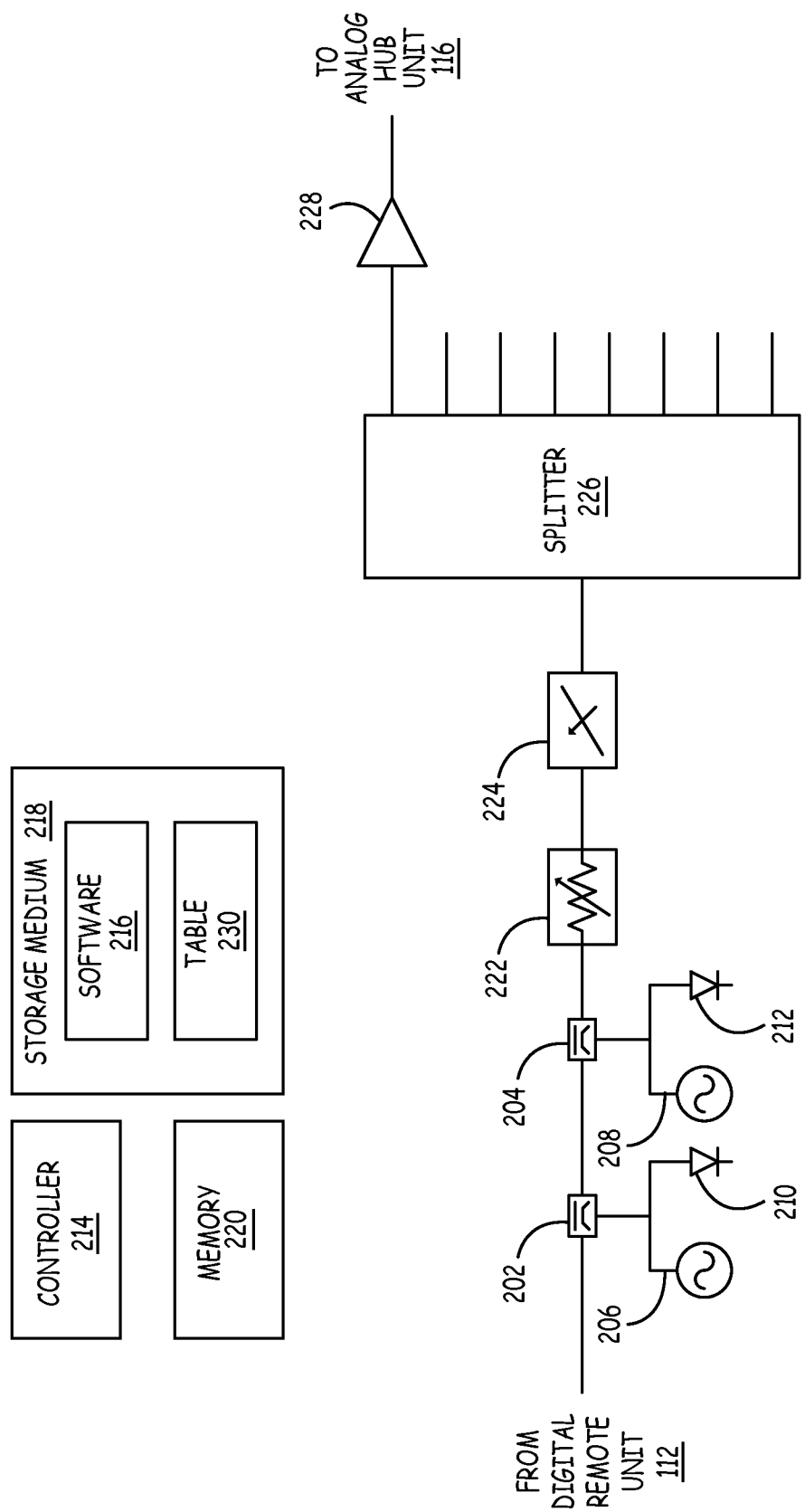
FIG. 2 is a block diagram of an exemplary embodiment of a portion of the downstream signal path in the analog hub unit shown in FIG. 1.

A portion of the downstream signal path in the analog hub unit 116 is shown in FIG. 2. In the particular embodiment shown in FIG. 2, the downstream signal path includes couplers 202 and 204 for injecting a downstream low pilot tone (for example, a pilot tone at 44 MHz) and a downstream high pilot tone (for example, a pilot tone at 696 MHz), respectively, into the downstream intermediate-frequency wide band signals produced from all of the downstream frequency bands distributed by the DAS 100. The downstream low pilot tone 206 and downstream high pilot tone 208 are produced in a conventional manner using, for example, a frequency synthesizer. In the particular embodiment shown in FIG. 2, RF diodes 210 and 212 for adjusting the levels of the low frequency and high frequency pilot tones.

The power levels of the downstream low pilot tone 206 and the downstream high pilot tone 208 are controlled by a controller 214. The controller 214 is implemented using a suitable programmable processor (such as a microprocessor or microcontroller) that executes software 216 that implements at least some of the functionality described here as being implemented by the analog hub unit 116. The software 216 comprises program instructions that are stored (or otherwise embodied) on an appropriate storage medium or media 218 (such as flash or other non-volatile memory, magnetic disc drives, and/or optical disc drives). At least a portion of the program instructions are read from the storage medium 218 by the programmable processor for execution thereby. The storage medium 218 on or in which the program instructions are embodied is also referred to here as a "program-product". Although the storage media 218 is shown in FIG. 1 as being included in, and local to, the analog hub unit 116, it is to be understood that remote storage media (for example, storage media that is accessible over a network or communication link) and/or removable media can also be used. The analog hub unit 116 also includes memory 220 for storing the program instructions (and any related data) during execution by the programmable processor. Memory 220 comprises, in one implementation, any suitable form of random access memory (RAM) now known or later developed, such as dynamic random access memory (DRAM). In other embodiments, other types of memory are used.

In the particular embodiment shown in FIG. 2, the downstream signal path includes a variable digital attenuator 222 to adjust the gain of the combined downlink signals and a variable slope circuit 224 to adjust the slope of the downstream signals. The variable digital attenuator 222 and the variable slope circuit 224 are coupled to the controller 214, and the controller 214 controls the settings for the variable digital attenuator 222 and variable slope circuit 224 in order to pre-compensate for a fixed amount of cable loss (for example, 50 meters worth of coaxial cable loss).

The downlink signal output by the variable slope circuit 224 is supplied to a splitter 226, which splits the downlink signal into multiple versions of the downlink signal that are output (using amplifiers 228) to the remote clusters 120.

Although not shown in FIG. 1 or 2, a low-frequency control carrier is also combined with the downstream wide band signals and downstream pilot tones. Control data output by the controller 214 is modulated onto the control carrier for use in the configuration and administration of the remote clusters 120. In one implementation of such an exemplary embodiment, frequency-shift keying (FSK) is used to modulate control data onto a control carrier that is at frequency above the high frequency pilot tone (for example, at 808 MHz). In addition, a reference tone is combined with the downstream wide band signals, downstream pilot tones, and control carrier. The reference tone is used in synchronizing the frequency of local oscillators in the remote clusters 120 with a reference oscillator (not shown) in the analog hub unit 116.

Referring again to FIG. 1, each master remote antenna unit 124 receives the combined downstream signals from the analog hub unit 116. The master remote antenna unit 124 includes functionality to automatically adjust the gain and slope of the downstream combined signal received at the master remote antenna unit 124 and detect the power levels of the downstream pilot tones included in the combined downstream signal for use in AGC processing that is performed in the master remote antenna unit 124. The gain-and-slope adjusted downstream signal is then supplied to each of the slave antenna units 126 over a respective downstream coaxial cable 128. Also, the gain-adjusted wide band signal is also input to the internal slave unit 144 within the master remote antenna unit 124 over an internal connection.

Figure 3:
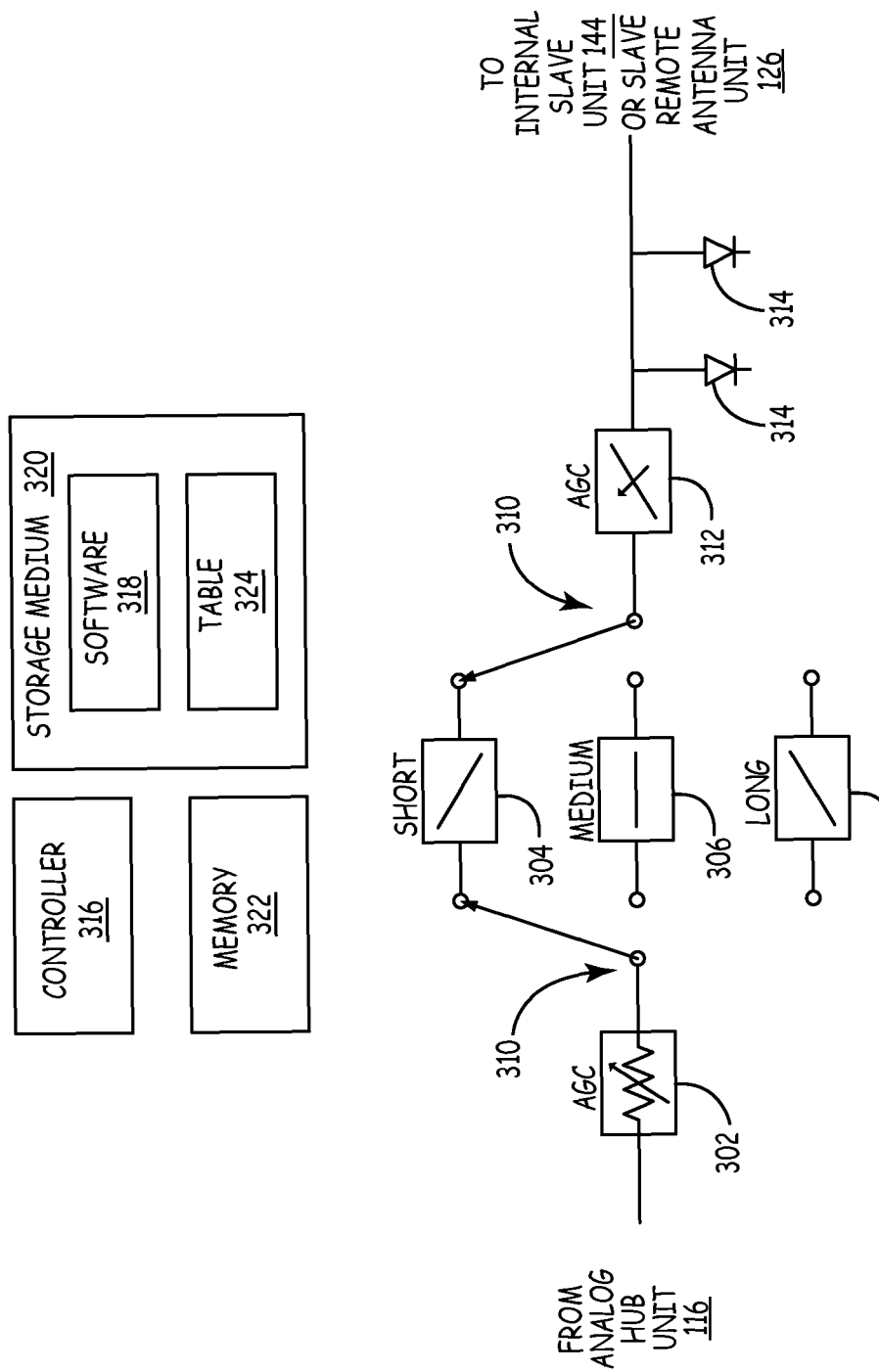
FIG. 3 is a block diagram of an exemplary embodiment of a portion of the downstream signal path in the master remote antenna unit shown in FIG. 1.

A portion of the downstream signal path in the master remote antenna unit 124 is shown in FIG. 3. In the particular embodiment shown in FIG. 3, the downstream signal path includes a variable digital attenuator 302 to adjust the gain of the combined downstream signal received at the master remote antenna unit 124.

Also, in the particular embodiment shown in FIG. 3, the downstream signal path includes three fixed slope adjustment paths—a "short" fixed slope adjustment path 304 corresponding to a zero length cable length between the antenna hub unit 116 and the master remote antenna unit 124, a "medium" fixed slope adjustment path 306 corresponding to the length of cable for which the downstream gain-adjustment functionality in the antenna hub unit 116 pre-compensates (50 meters in this embodiment), and a "long" fixed slope adjustment path 308 corresponding to a greater cable length between the antenna hub unit 116 and the master remote antenna unit 124 (100 meters in this embodiment).

The short fixed slope adjustment path 304 is configured with a downslope response that is intended to cancel out the pre-compensation applied to the downstream signals by the downstream gain-adjustment functionality in the antenna hub unit 116 (that is, pre-compensation for 50 meters of coaxial cable loss). The medium fixed slope adjustment path 306 is configured with a flat slope response such that the pre-compensation applied in the analog hub unit 116 is canceled by the coaxial cable loss between the analog hub unit 116 and the master remote antenna unit 124. The long fixed slope adjustment path 308 is configured with an upslope response that is intended to compensate for an amount of coaxial cable loss between the analog hub unit 116 and the master remote antenna unit 124 that is larger than the amount that was pre-compensated for in the analog hub unit 116.

A pair of switches 310 is used to select one of the fixed slope adjustment paths to include in the downstream signal path of the master remote antenna unit 124.

In the particular embodiment shown in FIG. 3, the downstream signal path also includes a variable slope circuit 312 to adjust the slope of the downstream signals. The downstream signal path also includes a pair of pilot power detectors 314. One of the pilot power detectors 314 is configured for detecting the power level of the downstream low pilot tone included in the gain-and-slope adjusted downstream signals. The other power detector 315 is configured for detecting the power level of the downstream high pilot tone included in the gain-and-slope adjusted downstream signals.

The master remote antenna unit 124 also includes a controller 316 that, among other things, controls and configures the variable digital attenuator 302, the switches 310, and variable slope circuit 312. The controller 316 also reads the power levels of the downstream low and high pilot tones detected by the pilot detectors 314 for use in configuration of the variable digital attenuator 302, the switches 310, and the variable slope circuit 312 and subsequent AGC processing performed in the master remote antenna unit 124.

The controller 316 is implemented using a suitable programmable processor (such as a microprocessor or microcontroller) that executes software 318 that implements at least some of the functionality described here as being implemented by the master remote antenna unit 124. The software 318 comprises program instructions that are stored (or otherwise embodied) on an appropriate non-transitory storage medium or media 320 (such as flash or other non-volatile memory, magnetic disc drives, and/or optical disc drives). At least a portion of the program instructions are read from the storage medium 320 by the programmable processor for execution thereby. The storage medium 320 on or in which the program instructions are embodied is also referred to here as a "program-product". Although the storage media 320 is shown in FIG. 3 as being included in, and local to, the master remote antenna unit 124, it is to be understood that remote storage media (for example, storage media that is accessible over a network or communication link) and/or removable media can also be used. The master remote antenna unit 124 also includes memory 322 for storing the program instructions (and any related data) during execution by the programmable processor. Memory 322 comprises, in one implementation, any suitable form of random access memory (RAM) now known or later developed, such as dynamic random access memory (DRAM). In other embodiments, other types of memory are used.

The gain-and-slope adjusted downstream signals output by the variable slope circuit 312 are split by a splitter (not shown in FIG. 3) and supplied to each of the slave antenna units 126 over a respective downstream coaxial cable 128 and to the internal slave unit 144 within the master remote antenna unit 124.

Although not shown in FIG. 1 or 3, the control data modulated onto the high-frequency control carrier that is included in the downstream signals received at the master remote antenna unit 124 is demodulated from the control carrier and supplied to the controller 316. Such control data is used in the configuration and administration of the remote cluster 120. The high-frequency control carrier communicated from the analog hub unit 116 is removed from the downstream signals that are communicated to each of the slave antenna units 126 and the internal slave unit 144 and replaced with a different high-frequency control carrier onto which the master remote antenna unit 124 modulates its own control data. The resulting high-frequency control carrier is combined with the downstream signals communicated to each of the slave antenna units 126 and the internal slave unit 144. Control data output by the controller 316 is modulated onto the control carrier for use in the configuration and administration of the slave antenna units 126 and the internal slave unit 144. In one implementation of such an exemplary embodiment, FSK modulation is used to modulate control data onto a high-frequency control carrier that is at same frequency as the one received from the analog hub unit 116.

In addition, the downstream signals communicated to each of the slave antenna units 126 and the internal slave unit 144 includes the reference tone supplied by the analog hub unit 116.

Referring again to FIG. 1, the slave antenna units 126 and the internal slave unit 144 within the master remote antenna unit 124 receive the downstream signals (which include the intermediate frequency versions of the downstream frequency bands, the downstream low and high pilot tones, the control carrier, and the reference clock) and reproduce radio frequency versions of a subset of the downstream frequency bands.

Figure 4:
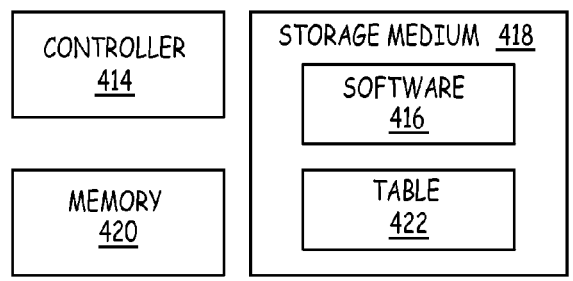
FIG. 4 is a block diagram of an exemplary embodiment of a portion of the downstream signal path through each of the slave antenna units and the internal slave unit shown in FIG. 1.
Figure 4:
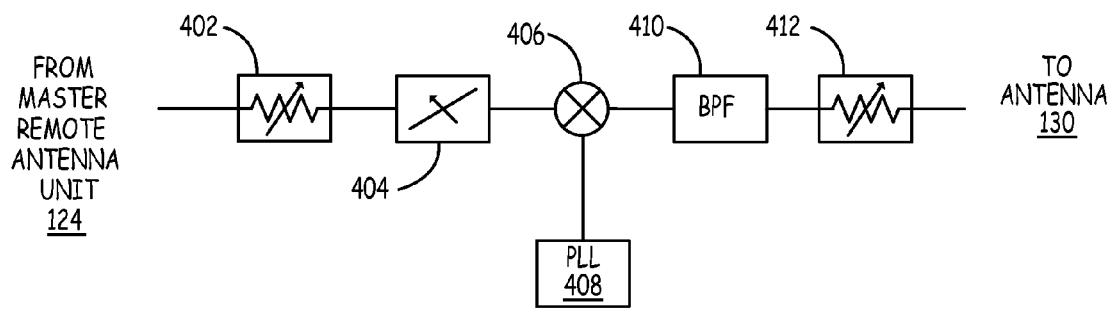

A portion of the downstream signal path through each of the slave antenna units 126 and the internal slave unit 144 is shown in FIG. 4. Only a single downstream signal path is shown in FIG. 4, though it is to be understood that each of the slave antenna units 126 and the internal slave unit 144 includes separate versions of the downstream signal path for each of the downstream RF frequency bands that that unit 126 and 144 outputs.

In the particular exemplary embodiment shown in FIG. 4, the downstream signal path in each of the slave antenna units 126 and the internal slave unit 144 includes a respective unit variable digital attenuator 402 and unit variable slope circuit 404 which are used, respectively, to apply a unit gain adjustment and a unit slope adjustment to the downstream narrow band signals in order to compensate for any unit-to-unit variation between the units 126 and 144. The downstream signal path shown in FIG. 4 also includes a mixer 406 that is used to up convert the intermediate frequency versions of the downstream wide band frequency band to the original RF frequency band for that downstream frequency band. A phase locked loop (PLL) 408 provides the relevant mixing signal to up convert the intermediate frequency versions of the downstream wide band frequency band to the original RF frequency band. The PLL 408 uses the reference tone in the downstream signals supplied to each of the slave antenna units 126 and the internal slave unit 144 to lock a respective local oscillator (not shown) used in the units 126 and 144 to the reference oscillator in the analog hub unit 116.

In the particular exemplary embodiment shown in FIG. 4, the downstream signal path also includes a band pass filter (BPF) 410 to output one of the radio frequency bands. The downstream signal path also includes a variable digital attenuator 412 to apply a band-specific gain adjustment to that radio frequency band.

The downstream RF frequency bands produced by each slave antenna unit 126 or internal slave unit 144 are combined and output to the relevant antenna 130 via a respective diplexer (not shown) and coaxial cable 132. The downstream RF frequency bands are radiated from the antenna 132 for reception by the relevant wireless devices 104.

Each of the slave antenna units 126 and internal slave unit 144 includes a respective controller 414 to, among other things, control and configure the functionality in the downstream signal path of that unit 126 or unit 144. The controller 414 is implemented using a suitable programmable processor (such as a microprocessor or microcontroller) that executes software 416 that implements at least some of the functionality described here as being implemented by the slave antenna unit 126 or internal slave unit 144. The software 416 comprises program instructions that are stored (or otherwise embodied) on an appropriate non-transitory storage medium or media 418 (such as flash or other non-volatile memory, magnetic disc drives, and/or optical disc drives). At least a portion of the program instructions are read from the storage medium 418 by the programmable processor for execution thereby. The storage medium 418 on or in which the program instructions are embodied is also referred to here as a "program-product". Although the storage media 418 is shown in FIG. 4 as being included in, and local to, the slave antenna unit 126 or internal slave unit 144, it is to be understood that remote storage media (for example, storage media that is accessible over a network or communication link) and/or removable media can also be used. The master remote antenna unit 124 also includes memory 420 for storing the program instructions (and any related data) during execution by the programmable processor. Memory 420 comprises, in one implementation, any suitable form of random access memory (RAM) now known or later developed, such as dynamic random access memory (DRAM). In other embodiments, other types of memory are used.

Similar processing is performed in the DAS 100 in the upstream direction.

Referring again to FIG. 1, each of the slave antenna units 126 and the internal slave unit 144 receives upstream radio frequency signals via the respective antenna 132 and generates intermediate frequency versions of the subset of the upstream radio frequency bands supported by the respective unit 126 and 144.

Figure 5:
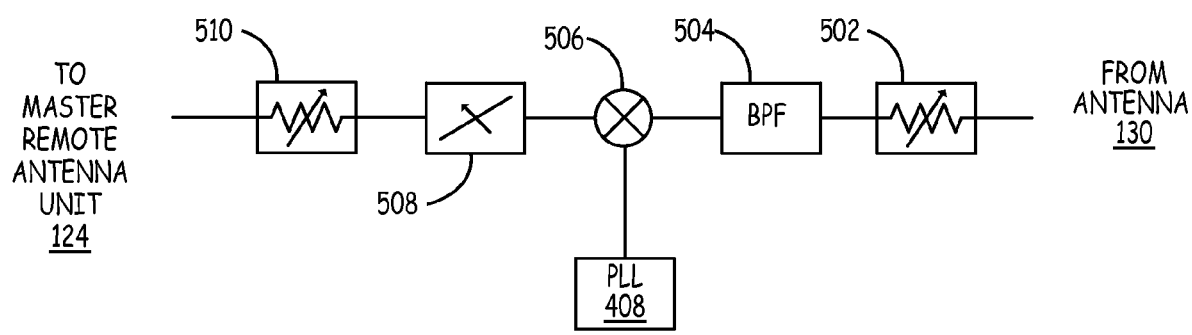
FIG. 5 is a block diagram of an exemplary embodiment of a portion of the upstream signal path through each of the slave antenna units and the internal slave unit shown in FIG. 1.

A portion of the upstream signal path through each of the slave antenna units 126 and the internal slave unit 144 is shown in FIG. 5. Only a single upstream signal path is shown in FIG. 5, though it is to be understood that each of the slave antenna units 126 and the internal slave unit 144 includes separate versions of the upstream signal path for each of the upstream RF frequency bands that that unit 126 and 144 handles.

In each of the slave antenna units 126 and the internal slave unit 144, upstream radio frequency signals broadcast by relevant wireless devices 104 are received from the respective antenna 130 via a respective coaxial cable 132 and diplexer (not shown). The upstream signal path includes a variable digital attenuator 502 to apply a band-specific gain adjustment to the received upstream radio frequency signals.

The upstream signal path also includes a band pass filter (BPF) 504 to output one of the upstream radio frequency bands. The upstream signal path shown in FIG. 5 also includes a mixer 506 that is used to down convert the filtered upstream radio frequency signal to produce an intermediate frequency version of that upstream frequency band. The same mixing signal (produced by the PLL 408) is used in all of the downstream signal paths and upstream signal paths in that unit 126 or 144.

In the particular exemplary embodiment shown in FIG. 5, each of the slave antenna units 126 and the internal slave unit 144 includes a respective variable slope circuit 508 and respective variable digital attenuator 510 which are used, respectively, to apply a unit slope adjustment and a unit gain adjustment to the upstream intermediate frequency version of the upstream frequency band in order to compensate for any unit-to-unit variation between the units 126 and 144.

Referring again to FIG. 1, all of the intermediate frequency versions of the upstream frequency bands handled by each slave antenna unit 126 and internal slave unit 144 are combined and communicated to the respective master remote antenna unit 124 over the respective upstream coaxial cable 128 (in the case of the slave antenna units 126) or over an internal connection (in the case of the internal slave unit 144).

The master remote antenna unit 124 combines all of the upstream intermediate frequency versions of the upstream frequency bands handled by the slave antenna units 126 and the internal slave unit 144 in order to create a set of adjacent but non-overlapping intermediate frequency bands. The set of adjacent but non-overlapping upstream intermediate frequency bands is also referred to here collectively as the "upstream wide band" or the "upstream wide band signals".

Figure 6:
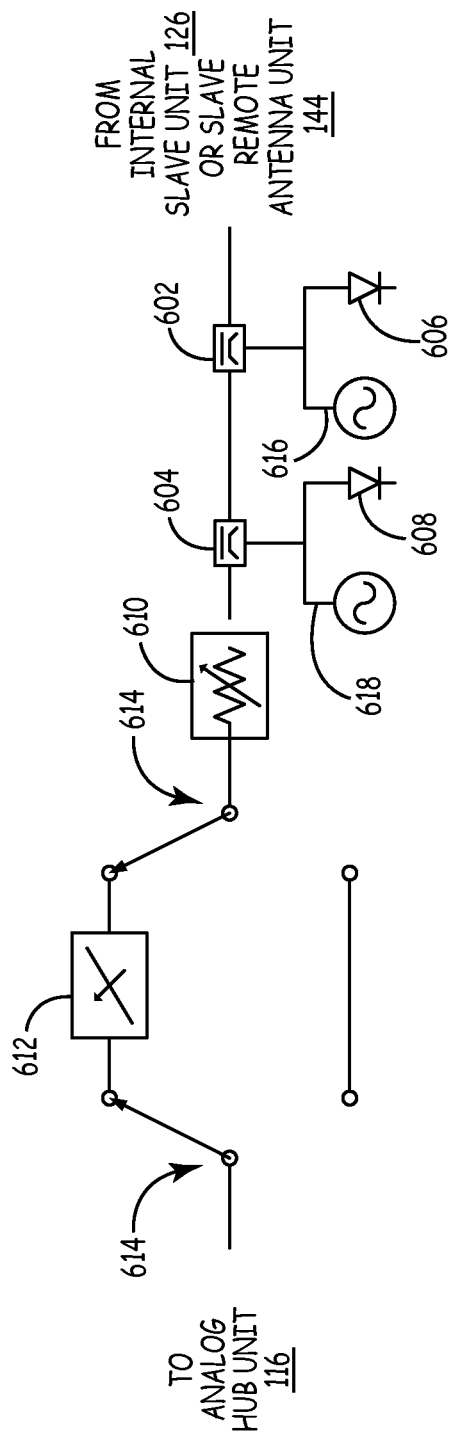
FIG. 6 is a block diagram of an exemplary embodiment of a portion of the upstream signal path through the master remote antenna unit shown in FIG. 1.

A portion of the upstream signal path through the master remote antenna unit 124 is shown in FIG. 6.

In the particular exemplary embodiment shown in FIG. 6, the upstream signal path includes couplers 602 and 604 for injecting an upstream low pilot tone (for example, a pilot tone at 44 MHz) and an upstream high pilot tone (for example, at 696 MHz), respectively, into the upstream intermediate-frequency wide band signals produced from the upstream signals received at the slave antenna units 126 and the internal slave unit 144. The upstream low pilot tone and upstream high pilot tone are derived from the downstream pilot tones received at the master remote antenna unit 124 from the analog hub unit 116. The power levels of the upstream low pilot tone and the upstream high pilot tone are controlled by the controller 316 in the master remote antenna unit 124 (not shown in FIG. 6) as described in more detail below. In the particular embodiment shown in FIG. 6, RF detectors 606 and 608 are used for adjusting the levels of the low frequency and high frequency pilot tones 616 and 618, respectively.

In the particular embodiment shown in FIG. 6, the upstream signal path includes a variable digital attenuator 610 to adjust the gain of the combined wide band signals under the control of the controller 316 in the master remote antenna unit 124.

In the exemplary embodiment shown in FIG. 6, there are two separate signal paths (also referred to here as "slope paths") provided in the upstream signal path—one slope path that includes a variable slope circuit 612 that is configured to pre-compensate for a particular amount of coaxial cable loss between the master remote antenna unit 124 and the analog hub unit 116 (for example, 50 meters of coaxial cable loss) and another slope path that does not pre-compensate for any coaxial cable loss. A pair of switches 614 is used to select one of the slope paths to include in the upstream signal path of the master remote antenna unit 124. The switches 614 are controlled by the controller 316 included in the master remote antenna unit 124.

The resulting uplink signal output by the variable slope circuit 612 (if the first slope path is selected) or the output of the variable digital attenuator 610 (if the second slope path is selected) is communicated to the analog hub unit 116 over the respective upstream coaxial 122.

Although not shown in FIG. 1 or 6, a high-frequency control carrier is also combined with the upstream wide band signals and upstream pilot tones. Control data output by the controller 316 is modulated onto the control carrier for communication to the analog hub unit 116. In one implementation of such an exemplary embodiment, FSK modulation is used to modulate control data onto a control carrier that is at frequency below the low frequency pilot tone (for example, at 808 MHz).

Referring again to FIG. 1, the analog hub unit 116 receives the uplink signals output by the master remote antenna units 124 in all of the remote clusters 120 that are coupled to the analog hub unit 116.

Figure 7:
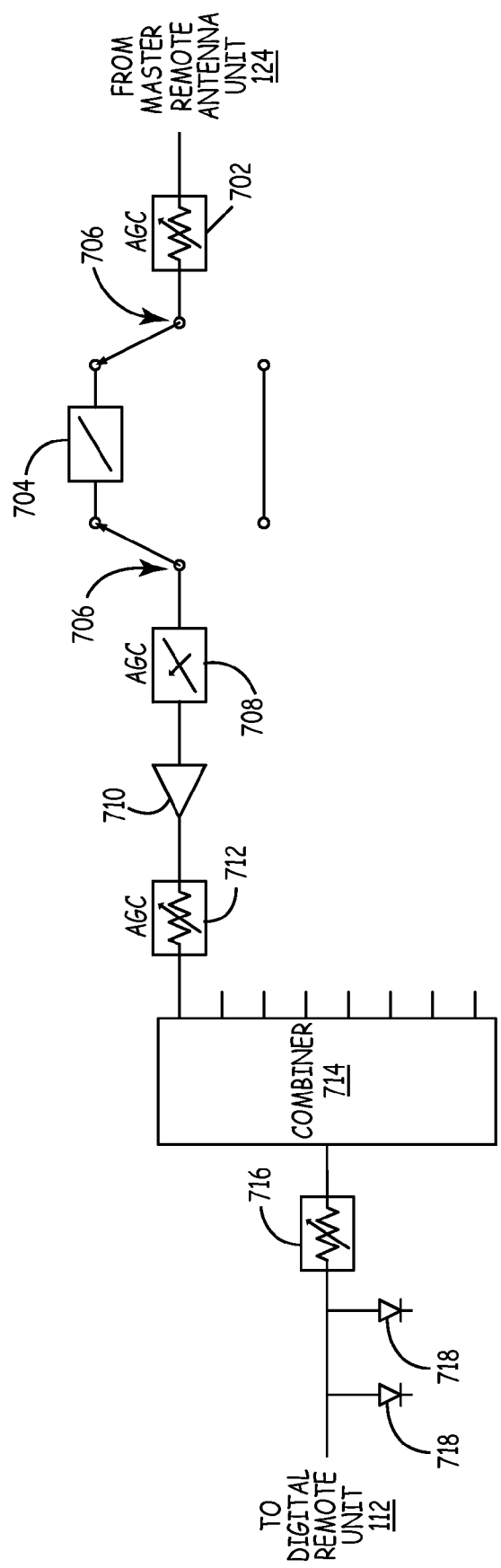
FIG. 7 is a block diagram of an exemplary embodiment of a portion of the upstream signal path of the analog hub unit shown in FIG. 1.

A portion of the upstream signal path of the analog hub unit 116 is shown in FIG. 7. The upstream signal path of the analog hub unit 116 includes a separate branch for each of the remote clusters 120 to which the analog hub unit 116 is coupled. However, for clarity of illustration, only a single branch is shown in FIG. 7.

Each such branch includes a variable digital attenuator 702 to adjust the gain of the upstream signals received at the analog hub unit 116 from one of the master remote antenna units 124. The variable digital attenuator 702 is controlled by the controller 214 (not shown in FIG. 7) in the analog hub unit 116.

In the exemplary embodiment shown in FIG. 7, there are two separate paths (also referred to here as "slope paths") in each of the branches of the upstream signal path in the analog hub unit 116—a "long" slope path that includes a variable slope circuit 704 that is configured to compensate for an additional amount of coaxial cable loss beyond what was pre-compensated for in the respective master remote antenna unit 124 (for example, 50 meters of additional coaxial cable loss) and a "short" slope path that does not compensate for any additional amount of coaxial cable loss. A pair of switches 706 is used to select one of the slope paths to include in that branch of the upstream signal path of the analog hub unit 116. The switches 706 are controlled by the controller 214 included in the analog hub unit 116.

Each branch in the upstream signal path also includes a variable slope circuit 708 to adjust the slope of the upstream signals. The controller 214 in the analog hub unit 116 controls the variable slope circuit 708.

Each branch in the upstream signal path also includes an amplifier 710 to amplify the upstream signals received from the master remote antenna unit 124 handled by that branch.

Each branch in the upstream signal path also includes a second variable digital attenuator 712 to variably adjust the gain of the upstream signals in that path after the amplifier 710. The controller 214 in the analog hub unit 116 controls the variable digital attenuator 712.

The upstream signals from all of the remote clusters 120 are combined by a combiner 714. The resulting combined upstream signals include intermediate frequency versions of all frequency bands distributed by the DAS 100. A "unit gain" variable digital attenuator 716 applies a common gain adjustment to the combined upstream signals from all of the remote clusters 120.

In the particular embodiment shown in FIG. 7, the upstream signal path also includes a pair of pilot power detectors 718. One of the pair of pilot power detectors 718 is configured for detecting the power level of the upstream low pilot tone included in the upstream signals. The other power detector 718 is configured for detecting the power level of the upstream high pilot tone included in the upstream signals. The detected power levels of the upstream low and high pilot tones are used by the controller 216 in the analog hub unit 116 to automatically control the gain and slope in each branch of the upstream signal path in the analog hub unit 166 in a conventional manner. In one implementation of such an embodiment, such AGC processing is carried out by adjusting the settings of one or more of the variable digital attenuator 702, the variable slope circuit 708, and the variable digital attenuator 712.

The combined upstream signal output by the unit gain variable digital attenuator 716 (which contains intermediate frequency versions of all of the upstream frequency bands) is then output to the digital remote unit 112 coupled to that analog hub unit 116 over the upstream coaxial cables 118. In the exemplary embodiment shown in FIG. 1, because the digital remote unit 112 includes a separate module for digitizing each upstream frequency band, the combined upstream signal is split and supplied to each such module in the remote digital unit 112.

For each of the eight upstream frequency bands distributed by the DAS 100, the respective A/D module in the digital remote unit 112 band pass filters the intermediate frequency version of that frequency band out of the single combined upstream wide band signal received from each analog hub unit 116 and digitizes that frequency band.

For each of the upstream fibers 114, the digital remote unit 112 frames together the digital samples for one or more upstream frequency bands (along with overhead data such as, for example, synchronization data and gain control data) and communicates the resulting frames to the digital host units 110 over the upstream fiber 114 in a respective one of the fiber pairs.

The digital host unit 110 receives the upstream frames from each of the digital remote units 112 and removes the digital samples contained in each frame.

Where multiple digital remote units 112 are coupled to a single digital host unit 110, the digital host unit 110, for each upstream frequency band, combines the digital samples received from each of the digital remote units 112 for that upstream frequency band. In one implementation of such an embodiment, the digital samples are combined by digitally summing, for each sample period, the digital samples received from each digital remote unit 112 for each upstream frequency band. That is, in such an implementation, for each sample period, the respective digital samples for each upstream frequency band are added together (with suitable overflow control to keep the sum within the number of bits supported by the digital-to-analog process in the digital host unit 110).

The digital host unit 110 uses a digital-to-analog process to create analog upstream intermediate frequency signals for each of the upstream frequency bands (using the associated overhead data in the frames to, for example, synchronize the digital samples and oscillators used in the D/A process and adjust the gain of the resulting IF signals).

The digital host unit 110 then individually up-converts the analog upstream intermediate frequency signals for each of the upstream frequency bands back to the respective original radio frequency at which the corresponding signals were received at one or more of the remote clusters 120. The gain of the resulting radio frequency versions of the upstream frequency bands is adjusted. The resulting gain-adjusted upstream radio frequency wide band signals are communicated to the one or more base stations 102.

Automatic gain control (AGC) takes place between the analog hub unit 116 and each master remote antenna unit 124 in order to automatically compensate for coaxial cable loss that occurs between those units 116 and 124. The master remote antenna unit 124 compensates for cable loss in the downlink direction while the analog hub unit 116 compensates for cable loss in the uplink direction.

Generally, during operation, the unit responsible for equalizing the cable loss (that is, either the master remote antenna unit 124 or the analog hub unit 116) will go through an iterative procedure to set the gain and slope in the relevant signal path. That is, in the downlink direction, each master remote antenna unit 124 iteratively adjusts the gain and slope by adjusting the variable digital attenuator 302 and the variable slope circuit 312. Likewise, in the uplink direction, the analog hub unit 116 iteratively adjusts the variable digital attenuators 702 and 712 and the variable slope circuit 708 for each branch in the uplink signal path.

Two types of automatic gain control are performed in the DAS 100—a "fast" AGC in which initial gain and slope settings are determined in a relatively short amount of time (for example, as a part of the processing the units perform when powered on) and a "slow" AGC in which the gain and slope settings are gradually changed over time (for example, after the fast AGC has completed).

Figure 8:
FIG. 8 is a block diagram illustrating one example of entries contained in the table maintained at the master remote antenna unit shown in FIG. 1.
Figure 8:
Figure 8:

The software 318 executing on the controller 316 in the master remote antenna unit 124 uses a table 324 (or other suitable data structure) maintained at the master remote antenna unit 124 to perform the fast AGC. One example of the entries contained in table 324 maintained at the master remote antenna unit 124 is shown in FIG. 8. In general, the table 324 contains multiple entries 802. In the particular exemplary embodiment shown in FIG. 8, each entry 802 in the table 324 is associated with one of the fixed slope paths through the master remote antenna unit 124 (that is, "short", "medium", "long").

Each entry 802 in the table 324 associates settings for the variable digital attenuator 302 and the variable slope circuit 312 with target levels for the downstream low pilot tone and high pilot tone. That is, each entry 802 includes a digital attenuator (DA) field 804 and a slope field 806 in which settings for the variable digital attenuator 302 and the variable slope circuit 312, respectively, are stored. Also, each entry 802 includes two pilot target fields 808 and 810—one for storing the target level for the downstream low pilot tone and the other for storing the target level for the downstream high pilot tone.

In the particular exemplary embodiment shown in FIG. 8, each entry 802 in the table 324 in the master remote antenna unit 124 also has an equivalent amount of cable loss that is associated with the gain and slope settings stored in that entry 802. The equivalent amount of loss is stored in a separate field 812.

In the particular exemplary embodiment shown in FIG. 8, each entry 802 in the table 324 also includes a frequency-band specific gain offset for each of the eight downstream frequency bands handled by the DAS 100. Each entry 802 includes a respective gain offset field 814 for each of the eight downstream frequency bands handled by the DAS 100 in which the respective gain offset is stored.

Figure 9A:
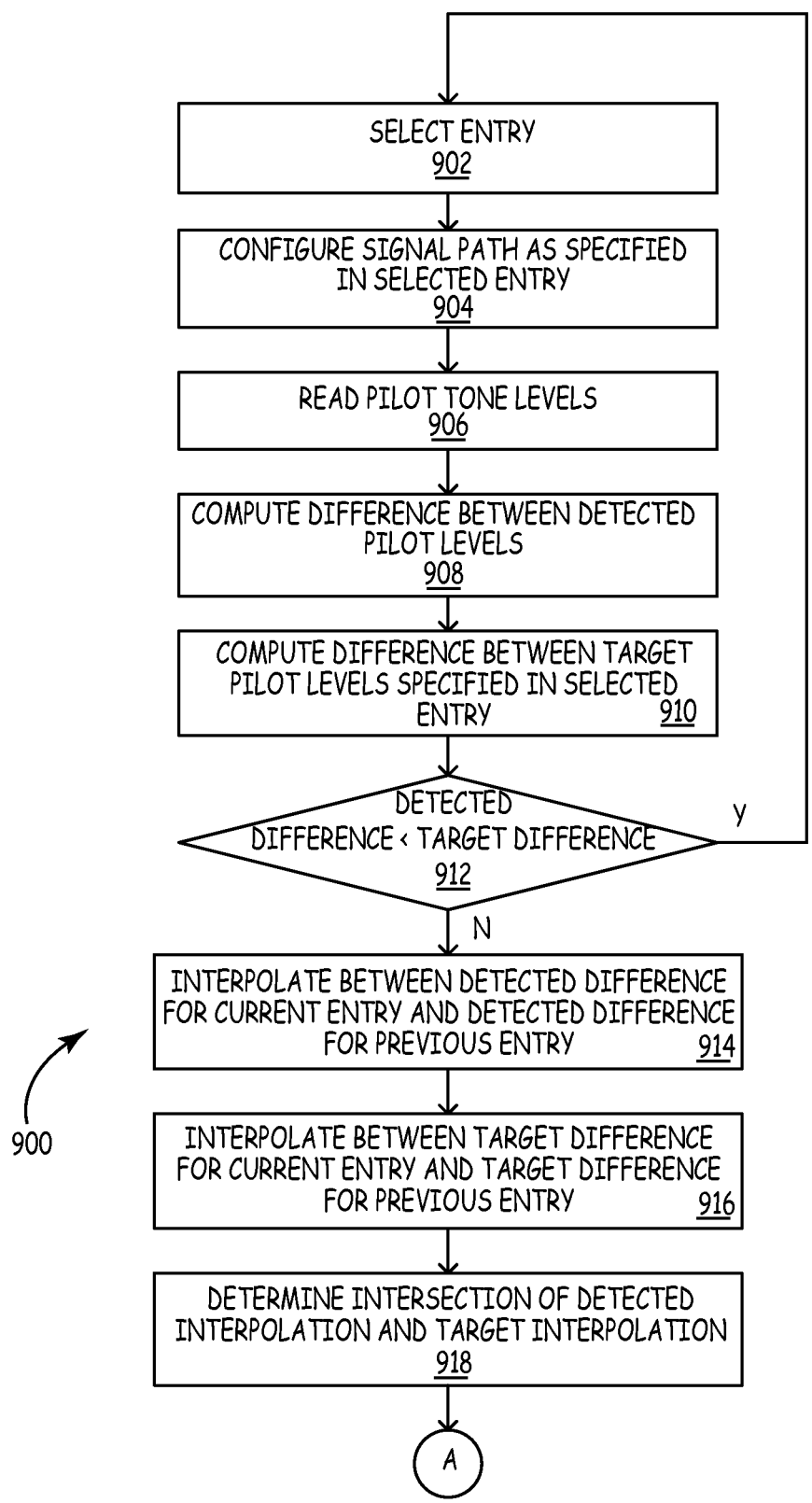
FIGS. 9A-9B are flow diagrams of one embodiment of a method of performing fast AGC in the downlink signal path of each master remote antenna unit shown in FIG. 3.
Figure 9B:
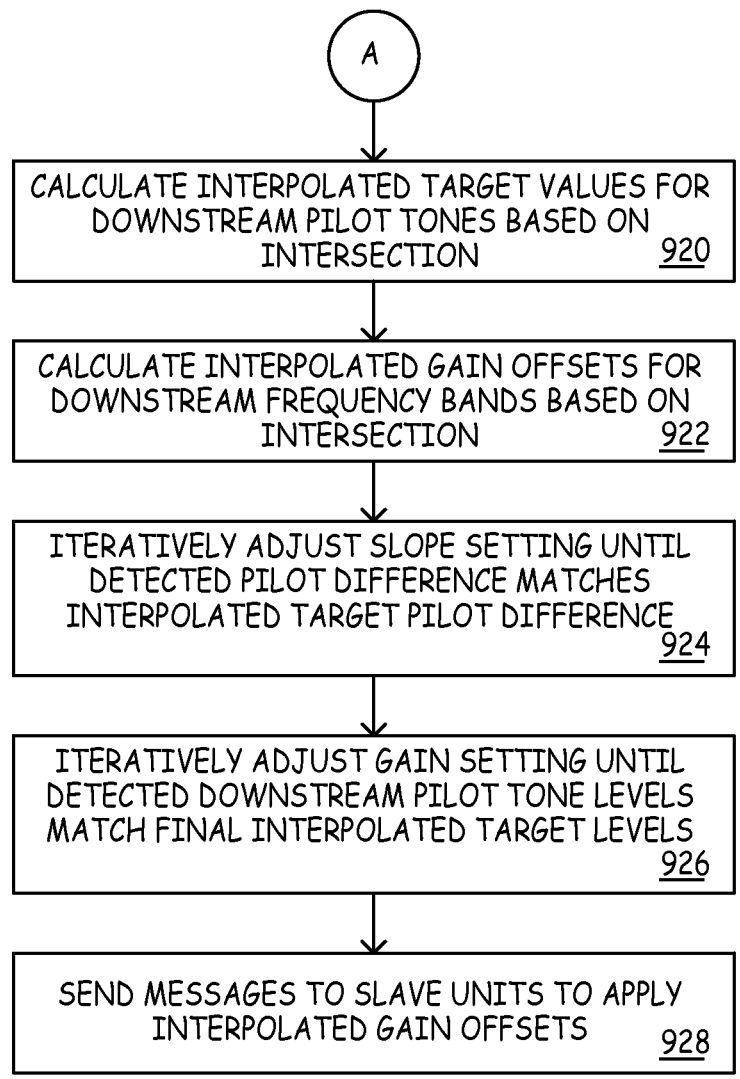

FIGS. 9A-9B are flow diagrams of one embodiment of a method 900 of performing fast AGC in the downlink signal path of each master remote antenna unit 124. The embodiment of method 900 shown in FIGS. 9A-9B is described here as being implemented in the hybrid digital-analog DAS 100 shown in FIGS. 1-7 using the table 324 shown in FIG. 8, though it is to be understood that other embodiments of method 900 can be implemented using other DAS, repeater, or distributed base station products and systems (for example, in a pure analog DAS). More specifically, method 900 is described here as being implemented in the software 318 executed by the controller 316 in the master remote antenna unit 124 in order to compensate for cable loss in the downlink.

During operation of method 900, the analog hub unit 116 supplies a downlink signal that includes the downlink low and high pilot tones having power levels determined in the configuration processing described below in connection with FIG. 13.

The software 318 executing on the controller 316 selects an entry 802 in the table 324 (block 902 of FIG. 9A). In the embodiment described here in connection with FIGS. 9A-9B, the entries 802 in the table 324 are sorted in a predetermined order and the software 318 executing on the controller 316 selects the first entry 802. In this exemplary embodiment, the entries 802 in the table 324 are sorted based on the length of the fixed slope path associated with that entry 802 and then by the slope setting. That is, all of the entries 802 that are associated with the short fixed slope path come first, the entries 802 associated with the medium fixed slope path come second, and the entries 802 associated with the long fixed slope path come last. The entries 802 associated with each of the fixed slope paths are then sorted based on the slope setting for the variable slope circuit 312. The example entries 802 shown in FIG. 8 are sorted as described here.

The software 318 sets the gain and slope settings for the variable digital attenuator 302 and the variable slope circuit 312, respectively, to the values specified in the selected entry 802 and selects the fixed slope path that is associated with the selected entry 802 (block 904). That is, the software 318 sets the gain and slope of the variable digital attenuator 302 and the variable slope circuit 312, respectively, to the gain and slope settings stored in the DA and slope fields 804 and 806, respectively, of the selected entry 802. The software 318 also sets the switches 310 in order to select the fixed slope path (short, medium, or long) that is associated with the currently selected entry 802 (for example, by selecting the short path for the first entry 802).

The software 318 then reads the pair of pilot power detectors 314 in order to determine the current power levels for the downstream low and high pilot tones while the gain and slope settings in the downlink signal path of the master remote antenna unit 124 are configured in accordance with the currently selected entry 802 (block 906). The software 318 computes the difference between the detected power level of the downstream high pilot tone and the detected power level of the downstream low pilot tone (block 908). This difference is also referred to here as the "detected pilot difference". The software 318 also computes the difference between the target level for the downstream high pilot tone stored in the currently selected entry 802 and the target level for the downstream low pilot tone stored in the currently selected entry 802 (block 910). This difference is also referred to here as the "target pilot difference". As noted above, the target level for the downstream high pilot tone is stored in the pilot target field 810 of the currently selected entry 802, and the target level for the downstream low pilot tone is stored in the pilot target field 808 of the currently selected entry 802.

Then, if the detected pilot difference is less than the target pilot difference (checked in block 912), the software 318 selects the next entry 802 in the table 324 (block 902) and repeats the processing associated with blocks 904-912.

If the detected pilot difference is equal to or greater than the target pilot difference, the final target values for the downstream pilot tones are bounded by two table entries 802—one before the ideal value and one after. The final target values are interpolated from two successive table entries 802—the currently selected entry 802 and the immediately previous entry 802. The table 324 is configured so that interpolation can only occur between successive entries 802 that are associated with the same fixed slope path and never occurs between entries 802 associated with different fixed slope paths. Thus, table 324 is constructed in order to guarantee some amount of overlap between the last entry 802 for the short slope path or medium slope path and the first entry for the medium slope path or long slope path, respectively. This overlap means that the detected pilot difference for the last entry for the short slope path or the medium slope path should always exceed the detected pilot difference for the first entry for the medium slope path or long slope path, respectively.

The interpolation is done as follows. The software 318 interpolates between the detected pilot difference for the currently selected entry 802 in the table 324 and the detected pilot difference for the previously selected entry 802 (block 914). This interpolation is also referred to here as the "detected interpolation". The software 318 also interpolates between the target pilot difference for the currently selected entry 802 in the table 324 and the target pilot difference for the previously selected entry 802 (block 916). This interpolation is also referred to here as the "target interpolation". Then, the software 318 determines where the detected interpolation intersects with the target interpolation (block 918).

Figure 10:
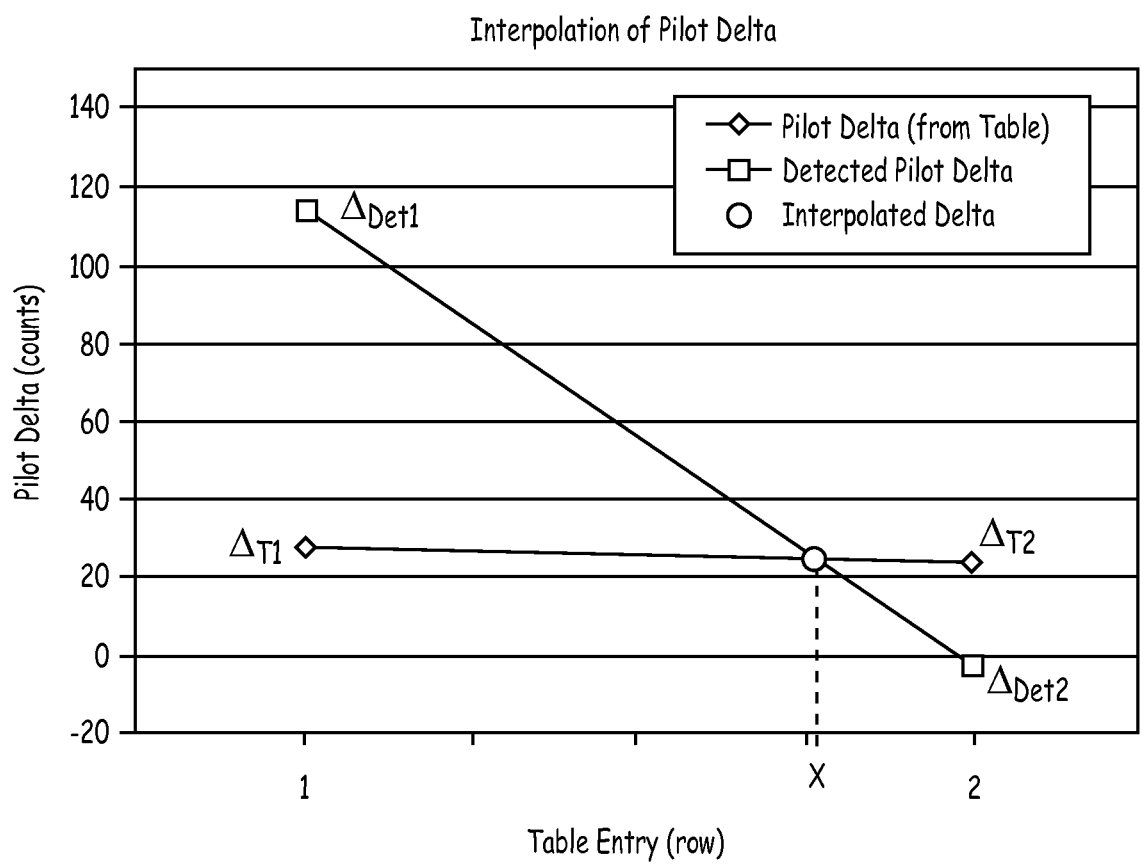
FIG. 10 illustrates one example of a detected interpolation and a target interpolation.

FIG. 10 illustrates one example of a detected interpolation and a target interpolation. In the example shown in FIG. 10, $\Delta_{Det1}$ represents the detected pilot difference for the currently selected entry 802 and $\Delta_{Det2}$ represents the detected pilot difference for the previously selected entry 802 in the table 324. Also, in the example shown in FIG. 10, $\Delta_{T1}$ represents the target pilot difference associated with the currently selected entry 802, and $\Delta_{T2}$ represents the target pilot difference associated with the previously selected entry 802.

The intersection of the detected interpolation and the target interpolation is determined using the following equation:

$$X = \frac{\Delta_{Det1} - \Delta_{T1}}{\Delta_{T2} - \Delta_{T1} - \Delta_{Det2} + \Delta_{Det1}} \quad (1)$$

where X represents the intersection point.

Referring again to FIG. 9B, the software 318 then calculates final interpolated target values for the downstream low and high pilot tones using the intersection of the detected interpolation with the target interpolation (block 920 of FIG. 9B) and calculates final interpolated gain offsets for each of the downstream frequency bands using the intersection of the detected interpolation with the target interpolation (block 922).

The final interpolated target values for the downstream low and high pilot tones are calculated as follows using the intersection X:

$$P_{LX} = P_{L-1} + X(P_{L-2} - P_{L-1}) \quad (2)$$

$$P_{HX} = P_{H-1} + X(P_{H-2} - P_{H-1}) \quad (3)$$

where $P_{L-1}$ is the target level for the downstream low pilot tone for the currently selected entry 802 from the table 324, $P_{L-2}$ is the target level for the downstream low pilot tone for the previously selected entry 802, $P_{H-1}$ is the target level for the downstream high pilot tone for the currently selected entry 802, and $P_{H-2}$ is the target level for the downstream high pilot tone for the previously selected entry 802 and $P_{LX}$ is the final interpolated target value for the downstream low pilot tone and $P_{HX}$ is the final interpolated target value for the downstream high pilot tone.

A similar equation is used to calculate each of the final band-specific gain offsets:

$$G_X = G_{N1} + X(G_{N2} - G_{N1}) \quad (4)$$

where $G_{N1}$ is the gain offset specified in the currently selected entry 802 for frequency band N, $G_{N2}$ is the gain offset specified in the previously selected entry 802 for frequency band N, and $G_X$ is the final interpolated gain offset for frequency band N.

The software 318 iteratively adjusts the setting for the variable slope circuit 312 until the detected pilot difference matches the difference between the final interpolated target value for the downstream high pilot tone and the final interpolated target value for the downstream low pilot tone (block 924). The difference between the final interpolated target value for the downstream high pilot tone and the final interpolated target value for the downstream low pilot tone is also referred to here as the "interpolated target pilot difference". In the particular exemplary embodiment described here in connection with FIGS. 9A-9B, the detected pilot difference "matches" the interpolated target pilot difference when the error (that is, difference) between the detected pilot difference and the interpolated target pilot difference is minimized.

After the detected pilot difference matches the interpolated target pilot difference, the software 318 iteratively adjusts the gain setting of the variable digital attenuator 302 until the detected levels for the downstream low and high pilot tones match the final interpolated target values for the downstream low and high pilot tones (block 926). In the particular exemplary embodiment described here in connection with FIGS. 9A-9B, the detected levels for the downstream low and high pilot tones match the final interpolated target values for the downstream low and high pilot tones when the average pilot error is minimized. Average pilot error is calculated as follows:

$$\text{Err}_{PltAvg1} = |P_{H-Det} - P_{H-Tgt} + P_{L-Det} - P_{L-Tgt}| \quad (5)$$

where $\text{Err}_{PltAvg1}$ is the average pilot error, $P_{H-Det}$ is the detected level for the downstream high pilot tone, $P_{H-Tgt}$ is the final interpolated target level for the downstream high pilot tone, $P_{L-Det}$ is the detected level for the downstream low pilot tone, and $P_{L\text{-}Tgt}$ is the final interpolated target level for the downstream low pilot tone. This error metric has the effect of forcing the response to be centered around the target response when there is a slope error.

The software 318 also sends messages to each of the slave antenna units 126 and internal slave unit 144 instructing those units to apply the final interpolated gain offsets for each frequency band to the appropriate variable digital attenuator 412 (block 928).

One example of the operation of method 900 is illustrated in FIG. 11. FIG. 11 shows an example of a table 324 that can be used with method 900. The software 318 executing on the controller 316 in the master remote antenna unit 124 starts with the first entry in the table shown in FIG. 11 and performs the processing described above in connection with blocks 904-912. This processing is repeated for entries 1-9 of the table shown in FIG. 11. When the gain and slope settings of the downlink signal path of the master remote antenna unit 124 are configured in accordance with entry 9 of the table shown in FIG. 11, the detected pilot difference is greater than the target pilot differences (101 vs. 70).

At this point, the software 318 interpolates between the detected pilot difference for entry 9 (that is, 101) and the detected pilot difference for entry 8 (that is, 51) and interpolates between the target pilot difference for entry 9 (that is, 70) and the target pilot difference for entry 8 (that is, 73). The software 318 then determines where the detected interpolation intersects with the target interpolation (that is, the value for X). In this case, the value of X is equal to 0.4137. Then, the software 318 calculates the final interpolated target values for the downstream low and high pilot tones, which are 302 and 373, respectively, in this case.

The software 318 also calculates the final interpolated gain offset for each of the frequency bands (only one of which is shown in FIG. 11). In the example shown in FIG. 11, the final interpolated gain offset for the first frequency band is −1.3 (which results from plugging the calculated value of X into equation 1 set forth above).

The software 318 then iteratively adjusts the setting for the variable slope circuit 312 until the detected pilot difference matches the difference between the final interpolated target value for the downstream high pilot tone and the final interpolated target value for the downstream low pilot tone (that is, 71).

After the detected pilot difference matches the interpolated target pilot difference, the software 318 iteratively adjusts the gain setting of the variable digital attenuator 302 until the detected levels for the downstream low and high pilot tones match the final interpolated target values for the downstream low and high pilot tones (that is, 302 and 307, respectively).

The software 318 also sends messages to each of the slave antenna units 126 and internal slave unit 144 instructing those units to apply the final interpolated gain offsets for each frequency band to the appropriate variable digital attenuator 412. For example, the variable digital attenuator 412 in the unit 126 or 144 that handles frequency band 1 is set with a gain offset equal to −1.3 (which was the calculated final interpolated gain offset for that frequency band).

Processing similar to that described above in connection with FIGS. 9A-B and 10-11 is performed by the software 216 executing on the controller 214 in the analog hub unit 116 in order to perform fast AGC in each branch of the uplink signal path of the analog hub unit 116. The main differences between the processing performed in the downlink and the processing performed in the uplink is that there are only two slope paths in the uplink and there are two variable digital attenuators 702 and 712 that are used for AGC purposes in each branch of the uplink signal path in the analog hub unit 116.

When adjusting the gain in the uplink path of the analog hub unit 116 in connection with block 926, special consideration must be given to which digital attenuator 702 or 712 is changed. In the particular embodiment described here in connection with FIGS. 1-11, priority is given to keeping the variable digital attenuator 702 at as low attenuation as possible. The other variable digital attenuator 712 is constrained to remain at a minimum value of 0 dB and a specified maximum value. When increasing gain, the variable digital attenuator 702 should be used until it reaches its minimum value of 0 dB. At this point, the variable digital attenuator 712 can be decreased. When decreasing gain, the variable digital attenuator 712 should be used until it reaches its maximum value, at which point the variable digital attenuator 702 can be used.

After the initial gain is set using fast AGC, the unit continuously monitors the pilot signal, averaging over time. As the averaged pilot signal varies from the target value, the gain of the unit is adjusted. This continuous gain adjustment accommodates minor fluctuations in the pilot over time, for instance, due to temperature drift. For this type of gain adjustment, only single steps are made in the digital attenuator at a time. When gain adjustments are made, they are made such that the error between the detected pilot and target pilot is minimized.

Averaging of the detected pilot should follow the equation below:

$$P_s(n) = \frac{1}{N}[(N - W)P_s(n-1) + WP_{Det}] \qquad (6)$$

where $P_{Det}$ is the detected pilot level, $P_s(n-1)$ is the previous smoothed pilot level, and $P_s(n)$ is the current smoothed pilot level (being computed). N and W are constants with current values of 8 and 2, respectively. Care must be taken during implementation to ensure that a limited number of bits does not cause $P_s$ to explode.

When measuring the pilot for continuous gain adjustment, several samples are taken over a period of time and then averaged together. Gain adjustments can be made periodically based on the error between the average pilot reading and the target pilot level. To prevent gain "bouncing", adjustments should only be made if the error exceeds a pre-determined amount.

During manufacturing, the downlink and uplink signal paths in the analog hub unit 116, master remote antenna unit 124, and the slave remote antenna units 126 and internal slave unit 144 are characterized so that those units can be properly configured during operation. Such characterization typically occurs in an automated test equipment (ATE) process. It is typically desirable to reduce the complexity and the amount of time required to complete such ATE characterization processes.

The slope of the response of the downlink or uplink signal path or coaxial cable can be determined in different ways. One way is to calculate the slope for a response by calculating the slope of a line between the power level of the low pilot tone and the power level of the high pilot tone. However, this approach does not determine the slope using the actual downlink and uplink frequency bands that are communicated in the DAS 100 and instead only uses the pilot tones.

In another approach, which is used in the embodiments described below, the actual downlink and uplink frequency bands of interest are used in characterizing the slope of the response of the downlink or uplink signal path or the loss in a coaxial cable.

Generally, this other approach attempts to fit a straight line to various data points associated with the actual downlink and uplink frequency bands of interest by minimizing the difference between the data and the line. In this sense, it is an "optimal" approach: it provides a best-fit for the sum total of all defined frequencies. Also, by including the modeled coax response in the fit, a more accurate end-to-end response can be obtained than if only the swept passband response for the relevant signal path were used.

In this approach, a test signal is applied to the relevant signal path and swept across the entire downlink or uplink wide band frequency range that includes all of the downlink or uplink frequency bands (depending on whether a downlink or uplink signal path is being characterized). While the test signal is being swept through the relevant frequency range, the resulting power level of the test signal is measured at an output port of the signal path. The power levels measured at the output port while the test signal is swept through the relevant frequency range are collectively referred to here as the "swept passband response" for that signal path.

Also, in this approach, a model is used to calculate, for each of the frequencies through which the test signal is swept, a corresponding loss for a coaxial cable having a given length. These calculated loss values are collectively referred to here as the "modeled coaxial cable response" or "cable response".

To determine the cable response, high resolution samples of the coax response for a large number of cable lengths could be captured to model the coax response for a given cable length. However, an alternative to maintaining a large number of coax response samples is to use a polynomial to estimate the coax loss. This approach is used in the embodiments described here.

In this approach, two separate third-order polynomial fits were made to the coax cable response. One polynomial was used for low frequencies (that is, frequencies less than 150 MHz) and the other for higher frequencies (that is, greater than 150 MHz). Breaking the coax response into two separate frequency bands, in this embodiment, provides a more accurate estimate than a single polynomial. However, it is to be understood that, in other embodiments, a different number of polynomials can be used. Both polynomials are of the form $y=a_0+a_1x+a_2x^2+a_3x^3$ where the coefficients are defined as listed in Table 1 below and y is the resulting loss (that is, response) for a given frequency x. The equations describe the response for 1,000 meters of coaxial cable as a function of frequency.

TABLE 1

| Coefficient | Value | |
| --- | --- | --- |
| | 50-150 MHz | 150-900 MHz |
| $a_0$ | 28.226070500 | 38.673193051 |
| $a_1$ | 0.498913441 | 0.320124823 |
| $a_2$ | −0.001210699 | −0.000177424 |
| $a_3$ | 0.0000021425 | 0.0000000654 |

To determine a corresponding response for a given cable length, the calculated response y is multiplied by the length l.

In determining the slope for a given signal path, a first-order least-squares fit on the swept passband response for the relevant signal path is cascaded with the modeled coaxial cable response. Assuming the resulting slope is zero and equal weighting for each data point and:

l=cable length (m)
$x_i$=frequency samples (MHz)
$s_i$=swept response samples as a function of frequency (dB)
$c_i$=modeled coax response samples as a function of frequency (dB/m)
$y_i$=cascade response samples (swept response plus modeled coax response, dB)
N=number of samples (across relevant frequency range), the cascade response is:

$$y_i = lc_i + s_i \tag{7}$$

Figure 12:
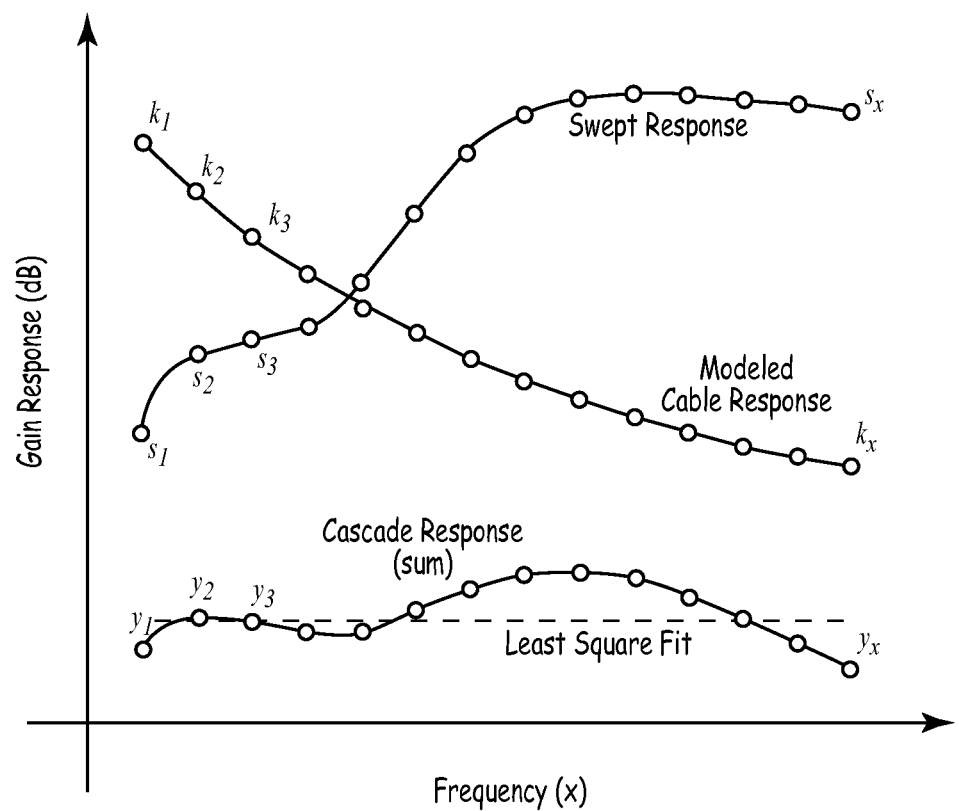
FIG. 12 illustrates the least squares approach used in the method of FIGS. 9A-9B.

FIG. 12 illustrates this least squares approach.

Using the least squares equation, a straight line of the form a+bx is fitted to the cascade response y. The mean square error is minimized using the chi-square function X:

$$\chi^2(a,b) = \sum_{i=1}^{N}\left(\frac{y-abx_i}{\sigma^2}\right)^2 = \sum_{i=1}^{N}\left(\frac{lc_i+s_i-a-bx_i}{\sigma^2}\right)^2 \tag{8}$$

After setting the partial derivatives with respect to a and b equal to zero, the normal equations are determined. To simplify, s is set to 1 (which assumes the same weighting for each data point). Since a zero slope for the cascade response is desired, l (cable length) is chosen such that b=0.

This leads to the intercept point a being:

$$a = \frac{1}{N}\left(l\sum_{i=1}^{N}c_i + \sum_{i=1}^{N}s_i\right) \tag{9}$$

The equivalent coax length l for a given swept response is:

$$l = \frac{\sum_{i=1}^{N}x_i \sum_{i=1}^{N}s_i - N\sum_{i=1}^{N}x_is_i}{N\sum_{i=1}^{N}x_ic_i - \sum_{i=1}^{N}x_i\sum_{i=1}^{N}c_i} \tag{10}$$

Figure 13:
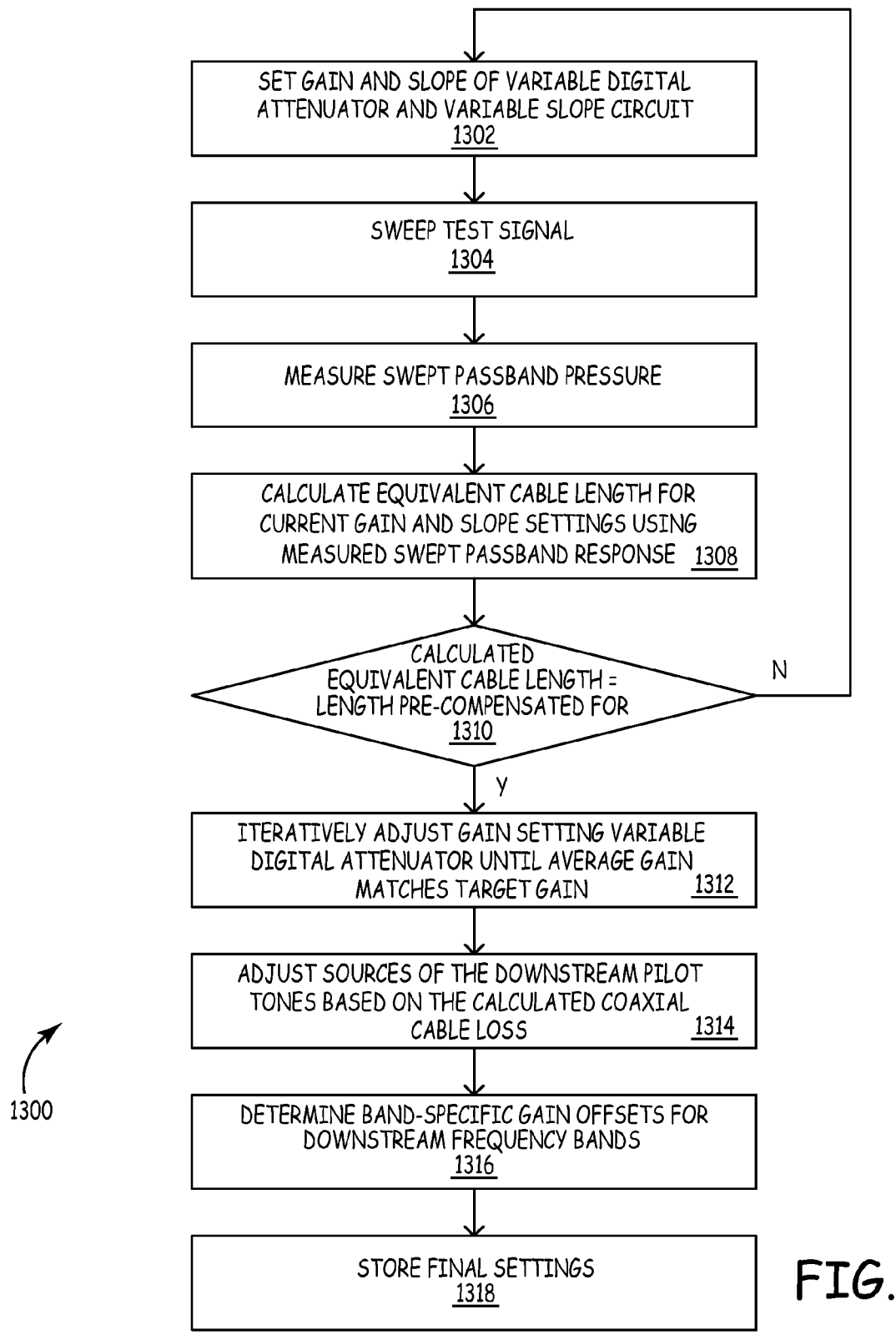
FIG. 13 is a flow diagram illustrating one exemplary embodiment of a method of configuring the downlink signal path of the analog hub unit shown in FIG. 2.

FIG. 13 is a flow diagram illustrating one exemplary embodiment of a method 1300 of configuring the downlink signal path of the analog hub unit 116. The exemplary embodiment of method 1300 shown in FIG. 13 is described here as being implemented in the hybrid digital-analog DAS 100 shown in FIGS. 1-7, though it is to be understood that other embodiments of method 1300 can be implemented using other DAS, repeater, or distributed base station products and systems (for example, in a pure analog DAS). Also, the exemplary embodiment of method 1300 shown in FIG. 13 is described here as being used to pre-compensate for 50 meters of coaxial cable loss with the following target values—a target gain level of −2.5 dB, a target slope level of 0 dB, a target output power level for the low pilot tone of −20 dBm, and a target output power level for the high pilot tone of −20 dBm.

In method 1300, the gain and slope of the variable digital attenuator 222 and the variable slope circuit 224, respectively, in the downlink signal path of the analog hub unit 116 are set to nominal values (block 1302). Then, a test signal is applied to one downstream input port of the analog hub unit 116 (referred to here as "downstream input port 1") and swept across the entire downlink wide band frequency range (block 1304). While the test signal is being swept through the downstream frequency range, the resulting power level of the test signal is measured at one of the downstream output ports of the analog hub unit 116 (referred to here as "downstream output port 1") (block 1306). In other words, the swept passband response is obtained at downstream output port 1.

Then, an equivalent coaxial cable length for the current gain and slope settings is calculated using the measured swept passband response (block 1308). The closed-form least-squares fit Equation 10 set forth above is used to calculate the equivalent length for the current gain and slope settings for the variable digital attenuator 222 and the variable slope circuit 224, respectively.

If the calculated equivalent coaxial cable length does not equal the desired amount of coaxial cable length for which the downstream signal path in the analog hub unit 116 is being configured to pre-compensate for (checked in block 1310), then the gain and slope settings are adjusted (block 1302) and the processing associated with blocks 1304-1310 are repeated. In other words, the slope settings of the downlink signal path in the analog hub unit 116 are iteratively adjusted until the calculated equivalent coaxial cable length equals the desired amount of coaxial cable length for which the downstream analog hub unit 116 is being configured to pre-compensate for.

When the calculated equivalent coaxial cable length equals the desired amount of coaxial cable length, then, without changing the slope setting, the gain setting of the variable digital attenuator 222 is iteratively adjusted until the average gain for all of the downstream output ports matches the target gain (block 1312). The average gain for all of the downstream output ports is calculated by applying a test signal to the downstream input port 1 of the analog hub unit 116 and sweeping the test signal across the entire downlink wide band frequency range. A separate swept passband response is measured at each of the downstream output ports of the analog hub unit 116. The swept passband responses are then averaged in order to create an average swept passband response. An average cascade response is calculated by adding the average swept passband response to the calculated modeled coaxial cable response. The average gain for all of the downstream ports is then calculated by fitting a straight line (with a slope of zero) to the average cascade response using the least-squares technique. The average gain is the intercept value for the fitted line (that is, the value of a where the straight line is of the form a+bx). In the particular exemplary embodiment described here in connection with FIG. 13, the average gain for all of the downstream output ports "matches" the target gain when the error (that is, the difference) between the average gain and the target gain is minimized.

Due to the limited resolution of both the variable digital attenuator 222 and the variable slope circuit 224, there will be slight errors in the actual configured gain and slope. These errors are taken into account below when setting the pilot levels.

Then, settings for the sources of the downstream low pilot tone and the downstream high pilot tone are adjusted based on the calculated coaxial cable loss (block 1314). Typically, the source of the downstream low pilot tone and the source of the downstream high pilot tone each include a variable voltage attenuator (VVA) (not shown) to control the output level of the respective pilot tone.

The calculated cable loss is determined using the actual configured slope rather than the target slope. Also, the gain error mentioned in the previous paragraph should also be taken into account when determining the target levels for the downstream low and high pilot tones. In the particular embodiment described here in connection with FIG. 13, it is assumed that the actual slope error is negligible. The target level for the downstream high pilot tone is derived from the measured swept response plus the measured gain error. The target level for the downstream low pilot tone is derived from the measured swept response plus measured gain error and additionally includes any pilot level error from setting the target level for the downstream high pilot tone.

Figure 14:
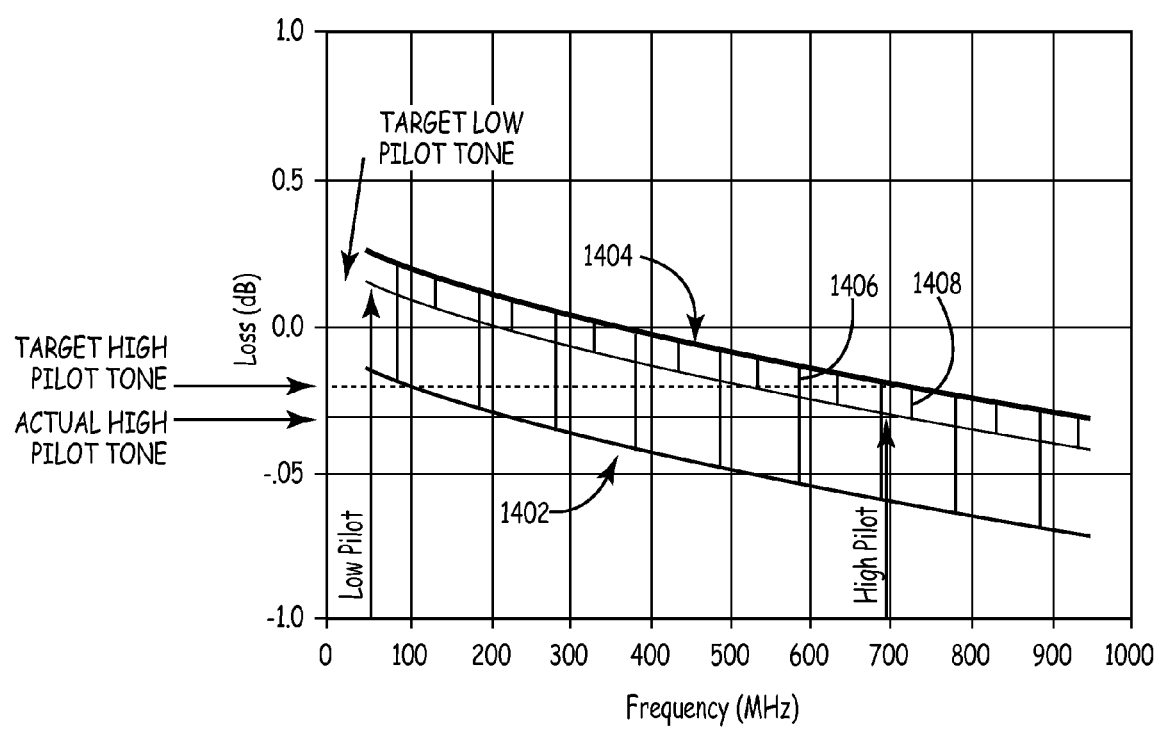
FIG. 14 illustrates one example of determining the target levels for the downstream low and high pilot tones in connection with the method of FIG. 13.

FIG. 14 illustrates one example of determining the target levels for the downstream low and high pilot tones. In the example shown in FIG. 14, the difference between the calculated response with the target gain (line 1402) and the measured response with the actual configured gain (line 1404) is the gain error 1406. The gain error 1406 is added to the current setting for the downstream high pilot tone. Also, the difference between the measured loss at the downstream high pilot tone frequency along the measured response line 1404 and the desired loss at the downstream high pilot tone frequency is also added to the current setting for the downstream high pilot tone (this difference is also referred to here as the "pilot error" 1408). A similar approach is used with the downstream low pilot tone.

Referring again to FIG. 13, the band-specific gain offsets are determined for each of the downstream frequency bands handled by the DAS 100 (block 1316). The band-specific gain offset for each downstream frequency band is calculated by determining the difference between the value of the average cascade response at that frequency band and the average gain for all downstream output ports calculated in connection with the determination made in block 1312.

The final settings for the downstream signal path in the analog hub unit 116 are stored in a table 230 maintained at the analog hub unit 116 (block 1318). Specifically, the following values are stored—settings for the variable digital attenuator 222 and the variable slope circuit 224, the measured power levels for the downstream high and low pilot tones and the corresponding settings for the variable voltage attenuators when configured to produce the pilot tones at the measured power levels, and the band-specific gain offsets for each of the downstream frequency bands handled by the DAS 100.

These stored values are used to configure the downlink signal path in the analog hub unit 116 when the analog hub unit 116 is deployed.

Figure 15:
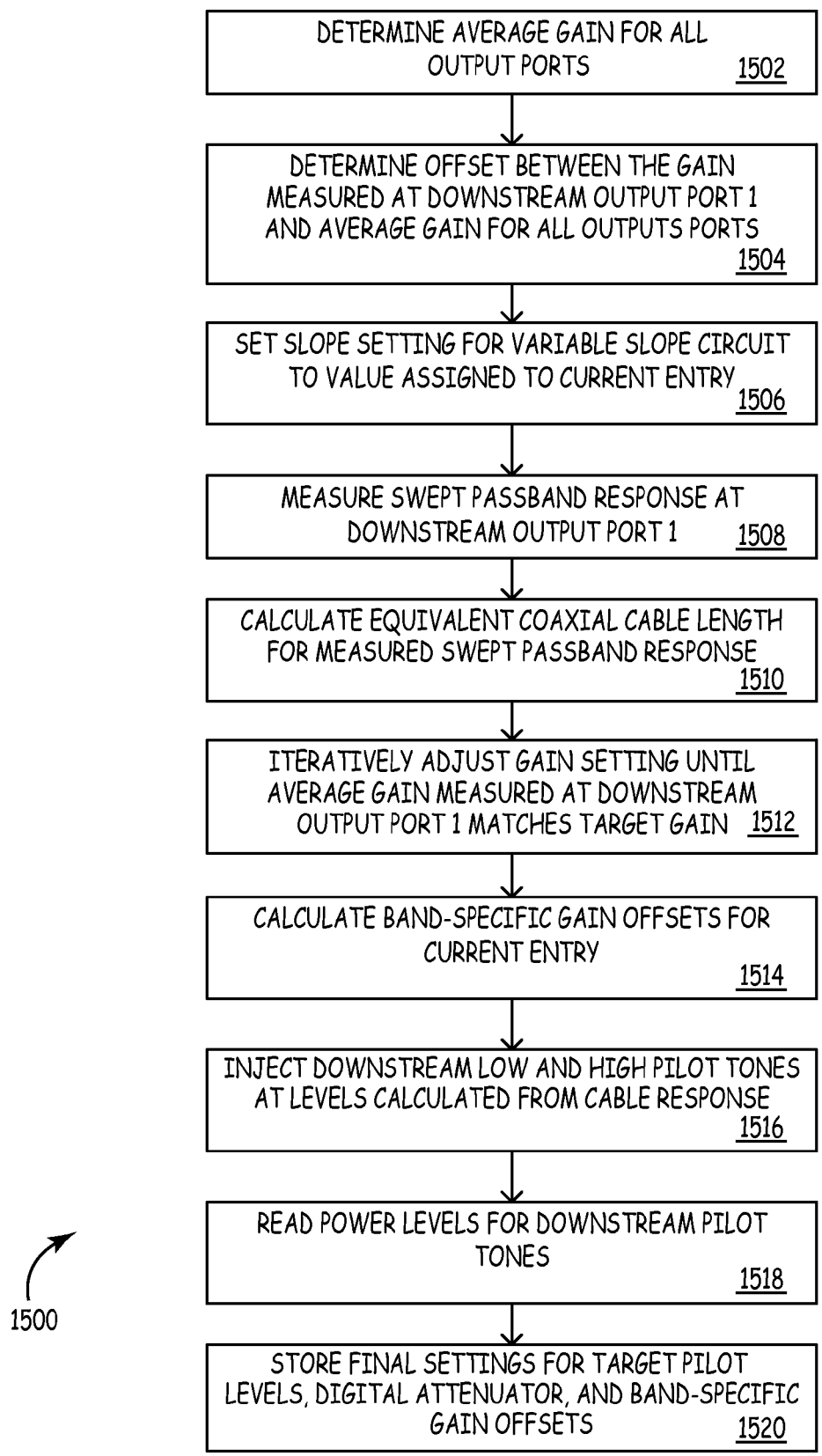
FIG. 15 is a flow diagram illustrating one exemplary embodiment of a method of configuring the downlink signal path of the master remote antenna unit shown in FIG. 3.

FIG. 15 is a flow diagram illustrating one exemplary embodiment of a method 1500 of configuring the downlink signal path of the master remote antenna unit 124. The exemplary embodiment of method 1500 shown in FIG. 15 is described here as being implemented in the hybrid digital-analog DAS 100 shown in FIGS. 1-7, though it is to be understood that other embodiments of method 1500 can be implemented using other DAS, repeater, or distributed base station products and systems (for example, in a pure analog DAS). Also, the exemplary embodiment of method 1500 shown in FIG. 15 is described here as being used to generate entries for the table 324.

In the particular embodiment described here in connection with FIG. 15, the master remote antenna unit 124 is configured using the following target values assuming 50 meters of coaxial cabling between the analog hub unit 116 and the master remote antenna unit 124—a gain of −19.5 dB, a slope of 0 dB, an input level for the downstream low pilot tone of −20 dBm, and an input level for the downstream high pilot tone of −20 dBm.

In order to configure the table 324 as described above in connection with FIG. 8, the short cable path corresponds to a negative cable length (for most of the variable slope circuit range). Mathematically this is not a problem when computing the equivalent coaxial cable length using Equation 10 set forth above, the value will just be negative.

Also, in this embodiment, there is assumed to be negligible port-to-port slope variation for the three IF output ports of the master remote antenna units 124. As with the analog hub unit 116, the average port gain is measured and referenced to a single output port (output port 1) so that all measurements can be made using a single output port.

Method 1500 comprises determining an average gain for all of the output ports (block 1502) and an offset between the average gain measured at downstream output port 1 and the average gain for all of the outputs ports (block 1504). This is done by selecting the medium fixed slope path 306, setting the slope of the variable slope circuit 312 to 0, and the gain setting of the variable digital attenuator 302 to a nominal value. Then, the average gain for all of the output ports of the master remote antenna unit 124 is calculated in a manner similar to that described above in connection with block 1312 of FIG. 13. The offset between the average gain measured at downstream output port 1 and the average gain for all of the outputs ports is then calculated using the measured swept passband response for output port 1. This is also referred to here as the "gain offset" for downstream output port 1.

Then, entries 802 for table 324 are generated. In this embodiment, minimum and maximum slope settings for the variable slope circuit 312 and a desired number of table entries 802 for each fixed slope path are used to generate the entries 802. For each fixed slope path, the slope setting for the first entry 802 is the specified maximum slope setting for the variable slope circuit 312, and the slope setting for the last entry 802 is the specified minimum slope setting for the variable slope circuit 312. The entries 802 in between the first and last entries 802 have slope settings that are evenly spaced between the specified maximum and minimum slope settings. For example, if the specified maximum slope setting for the variable slope circuit 312 is 0xB7, the minimum slope setting for the variable slope circuit 312 is 0x20, and five entries are desired for each fixed slope path, the five slope settings for the five entries 802 for each fixed slope path would be: 0xB7, 0x92, 0x6D, 0x48 and 0x20.

The following is performed to generate each entry 802 in the table 324.

First, the slope setting for the variable slope circuit 312 is set to the value assigned to the current entry 802 (block 1506). Then, the full passband is swept and a swept passband response is measured at downstream output port 1 (block 1508). Equation 10 set forth above is used to calculate the equivalent coaxial cable length for the measured swept passband response (block 1510). Then, the gain setting for the variable digital attenuator 302 is iteratively adjusted until the resulting average gain measured at downstream output port 1 (adjusted for the calculated gain offset for downstream output port 1) matches the target gain for the downlink path of the master remote antenna unit 124 (block 1512). In the particular exemplary embodiment shown in FIG. 15, the resulting average gain measured at downstream output port 1 (adjusted for the calculated gain offset for downstream output port 1) "matches" the target gain for the downlink path of the master remote antenna unit 124 when the error (that is, the difference) between resulting average gain measured at downstream output port 1 (adjusted for the calculated gain offset for downstream output port 1) and the target gain for the downlink path of the master remote antenna unit 124 is minimized. Due to the limited resolution in the variable digital attenuator 302, the gain cannot be set to exactly correspond to the measured slope. This gain error will be taken into account when determining the pilot levels.

Also, the band-specific gain offsets for the current entry 802 are calculated for each of the downstream frequency bands (block 1514). This is done by calculating the cascade response for the current slope setting using the measured swept passband response and the modeled coaxial cable loss calculated using the calculated equivalent coaxial cable length. The average gain for the cascade response is calculated using the least-squares method described above. The band-specific gain offset for each downstream frequency band is then calculated by determining the difference between the value of the measured swept passband response at that frequency band and the calculated average gain.

Then, the ATE equipment injects the downstream low and high pilot tones at levels calculated from the cable response (block 1516). The level for the downstream high pilot tone is determined from the measured swept passband response but is offset with the measured gain error due to the limited resolution in the variable digital attenuator 302. If the gain is set too high, then the injected pilot should be lowered by the same amount (and vise-versa). The target for the low frequency pilot should additionally take into account the error for the high pilot. Then, the power levels are read at the pilot tone detectors 314 for the downstream low and high pilot tones (block 1518).

Then, the equivalent coaxial cable length, setting for the variable digital attenuator 302, the slope setting for the variable slope circuit 312, power levels for the low and high pilot tones read at the pilot tone detectors 314, and the band-specific gain offsets are stored in the current entry 802.

The final settings for the target levels for the downstream pilot tones, the setting for the variable digital attenuator 302, the calculated cable loss (that is, equivalent coaxial cable length) and band-specific gain offsets are stored in the entry 802 (block 1520).

The processing of blocks 1506-1520 is repeated for each entry 802 in the table 314.

Figure 16:
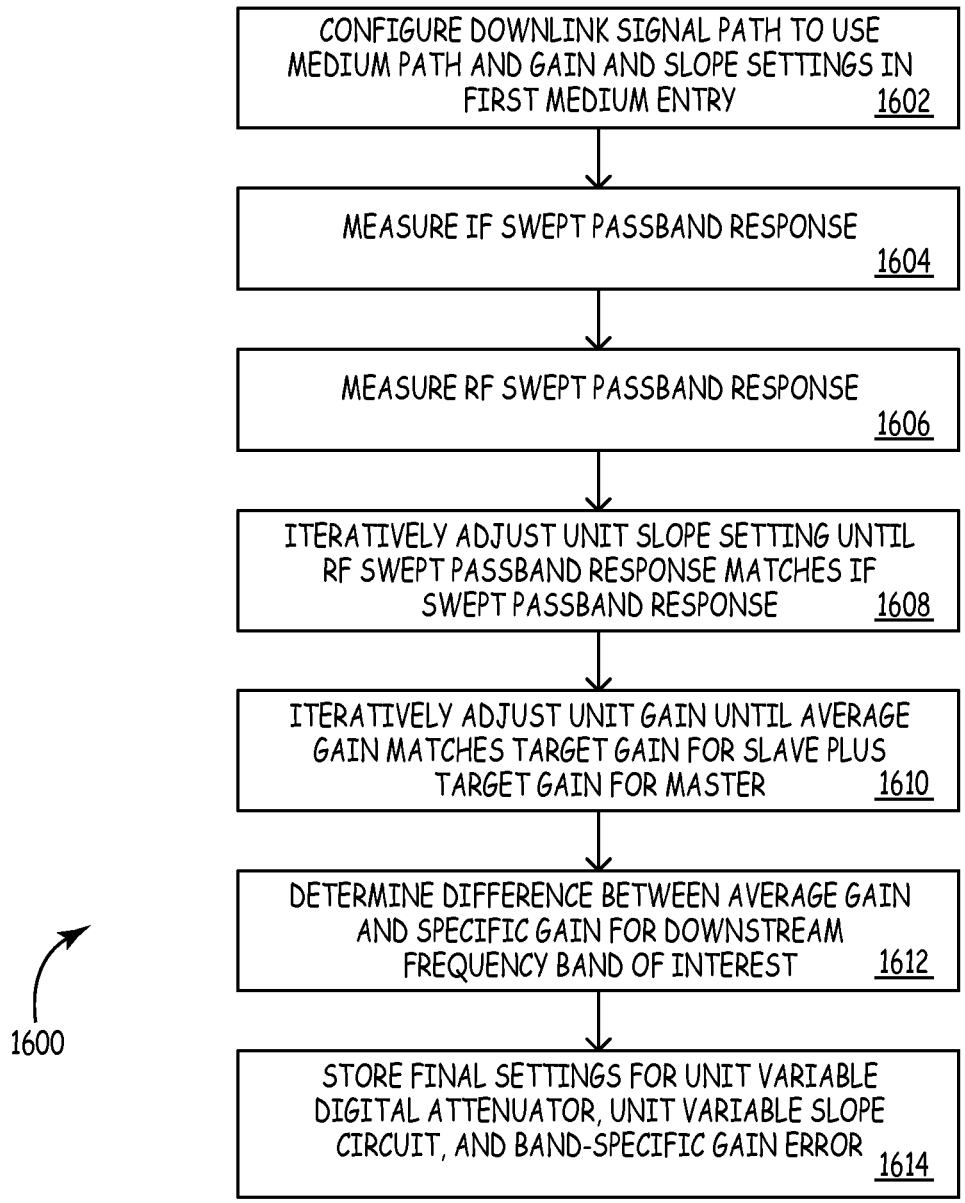
FIG. 16 is a flow diagram illustrating one exemplary embodiment of a method of configuring the downlink signal path of the internal slave unit in the master remote antenna unit shown in FIG. 4.

FIG. 16 is a flow diagram illustrating one exemplary embodiment of a method 1600 of configuring the downlink signal path of the internal slave unit 144 in the master remote antenna unit 124. The exemplary embodiment of method 1600 shown in FIG. 16 is described here as being implemented in the hybrid digital-analog DAS 100 shown in FIGS. 1-7, though it is to be understood that other embodiments of method 1600 can be implemented using other DAS, repeater, or distributed base station products and systems (for example, in a pure analog DAS).

During the operation of method 1600, the downlink signal path of the master remote antenna unit 124 is configured to use the medium fixed slope path 306 and the gain and slope settings for the variable digital attenuator 302 and the variable slope circuit 312 are set as specified in the first entry 802 in the table 324 for the medium fixed slope path 306 (block 1602). Then, the downlink signal path (from downlink input port 1 to the downlink (IF) output port 1) through the master remote antenna unit 124 is swept through the downlink frequency range and the resulting swept passband response is measured (block 1604). This measured swept passband response is also referred to here as the "measured IF swept passband response". The measured IF swept passband response reflects what the input to the internal slave unit 144 looks like.

The following processing associated with method 1600 is repeated for each of the downlink frequency bands handled by the internal slave unit 144 and the corresponding downstream signal path through the internal slave unit 144.

The downlink signal path through the master remote antenna unit 124 and the internal slave unit 144 (that is, from the downstream input port 1 of the master remote antenna unit 124 to the relevant downstream output antenna port of the internal slave unit 144) is swept through the downlink frequency range and the resulting swept passband response is measured at that downstream output antenna port of the internal slave unit 144 (block 1606). This measured swept passband response is also referred to here as the "measured RF swept passband response".

The slope setting of the unit variable slope circuit 404 is iteratively adjusted until the RF swept passband response measured at the relevant downstream output antenna port of the internal slave unit 144 matches the measured IF swept passband response (block 1608). The "measured RF swept passband response" is measured by sweeping the downlink signal path through the master remote antenna unit 124 and the slave antenna unit 144 (that is, from the downstream input port 1 of the master remote antenna unit 124 to the relevant downstream output antenna port of the internal slave unit 144) through the downlink frequency range and the resulting swept passband response is measured at the relevant downstream output antenna port of the internal slave unit 144. The RF swept passband response "matches" the measured IF swept passband response when the error (that is, the difference) between the RF swept passband response and the measured IF swept passband response is minimized.

The unit variable digital attenuator 402 is iteratively adjusted until the average gain measured at the relevant downstream output antenna port of the internal slave unit 144 matches a predetermined target gain for the internal slave unit 144 plus the predetermined target gain for the master remote antenna unit 124 (block 1610). The average gain measured at the relevant downstream output antenna port of the internal slave unit 144 "matches" a predetermined target gain for the internal slave unit 144 plus the predetermined target gain for the master remote antenna unit 124 when the error (that is, the difference) between the measured average gain and predetermined target gain for the internal slave unit 144 plus the predetermined target gain for the master remote antenna unit 124 is minimized.

Then, the difference between the average gain and the specific gain for the downstream frequency band of interest in the measured swept passband response is determined (block 1612). This difference is also referred to here as a "band-specific gain error".

The final settings for the unit variable digital attenuator 402 and the unit variable slope circuit 404 and the band-specific gain error is stored in a table 422 maintained at the slave antenna unit 144 (block 1614).

As noted above, the processing associated with blocks 1606-1614 is performed for each of the downstream frequency bands handled by the internal slave unit 144 and each of the corresponding downlink paths through the internal slave unit 144.

Similar processing is performed for each of the slave remote antenna units 126.

Figure 17:
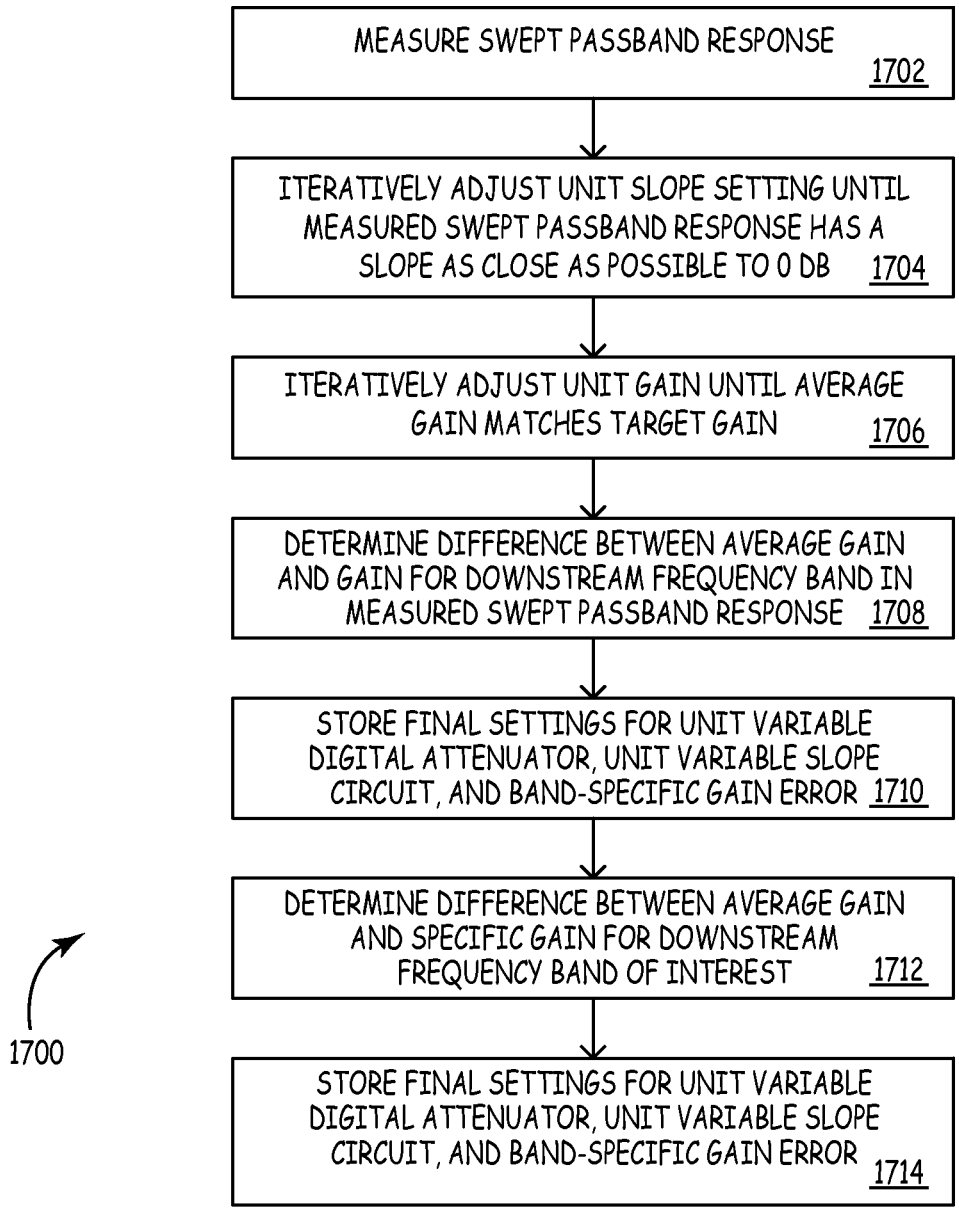
FIG. 17 is a flow diagram illustrating one exemplary embodiment of a method of configuring the downlink signal path of each slave remote antenna unit shown in FIG. 4.

FIG. 17 is a flow diagram illustrating one exemplary embodiment of a method 1700 of configuring the downlink signal path of each slave remote antenna unit 126. The exemplary embodiment of method 1700 shown in FIG. 17 is described here as being implemented in the hybrid digital-analog DAS 100 shown in FIGS. 1-7, though it is to be understood that other embodiments of method 1700 can be implemented using other DAS, repeater, or distributed base station products and systems (for example, in a pure analog DAS).

The processing of method 1700 is repeated for each of the downlink frequency bands handled by the slave remote antenna unit 126 and the corresponding downlink signal path through the slave remote antenna unit 126.

The downlink signal path through the slave remote antenna unit 126 (that is, from the downstream input port of the slave remote antenna unit 126 to the relevant downstream output antenna port of the slave remote antenna unit 126) is swept through the downlink frequency range and the resulting swept passband response is measured at the relevant downstream output antenna port of the slave remote antenna unit 126 (block 1702).

The slope setting of the unit variable slope circuit 404 is iteratively adjusted until the swept passband response measured at the relevant downstream output antenna port of the slave remote antenna unit 126 has a slope that is as close as possible to zero dB (block 1704). The swept passband response is measured by sweeping the downlink signal path through the slave remote antenna unit 126 through the downlink frequency range and the resulting swept passband response is measured at the relevant downstream output antenna port of the slave remote antenna unit 126.

The unit variable digital attenuator 402 is iteratively adjusted until the average gain measured at the relevant downstream output antenna port of the slave remote antenna unit 126 matches a predetermined target gain for the slave remote antenna unit 126 (block 1706). The average gain measured at the relevant downstream output antenna port of the slave remote antenna unit 126 "matches" a predetermined target gain for the slave remote antenna unit 126 when the error (that is, the difference) between the measured average gain and the predetermined target gain for the slave remote antenna unit 126 is minimized.

Then, the difference between the average gain measured at the relevant downstream output antenna port of the slave remote antenna unit 126 and the specific gain for the downstream frequency band of interest in the measured swept passband response is determined (block 1708). This difference is also referred to here as a "band-specific gain error".

The final settings for the unit variable digital attenuator 402 and the variable slope circuit 404 and the band-specific gain error is stored in table 422 maintained at the slave remote antenna unit 126 (block 1710).

As noted above, the processing associated with blocks 1702-1710 is performed for each of the downstream frequency bands handled by the slave remote antenna unit 126 and each of the corresponding downlink paths through the slave remote antenna unit 126.

Processing similar to that described above in connection with FIGS. 13-17 is performed in configuring the upstream signal paths of the slave remote antenna units 126, internal slave unit 144, master remote antenna unit 124, and analog hub unit 116.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A distributed antenna system comprising:
   a hub unit configured to receive an original downlink signal comprising a plurality of downstream frequency bands, each of the plurality of downstream frequency bands associated with a respective radio frequency channel; and
   a remote antenna unit that is communicatively coupled to the hub unit;

wherein the hub unit is configured to communicate a downstream transport signal from the hub unit to the remote antenna unit, wherein the transport signal is derived from the original downlink signal received at the hub unit;

wherein the remote antenna unit uses the downstream transport signal to generate a downstream radio frequency signal for radiation from an antenna associated with the remote antenna unit, wherein the downstream radio frequency signal comprises at least a subset of the plurality of downstream frequency bands;

wherein the remote antenna unit comprises automatic gain control functionality operable to automatically control at least one of a gain in the remote antenna unit and a slope in the remote antenna unit; and wherein the remote antenna unit uses a data structure comprising a plurality of entries, each of the entries associating at least one setting for the automatic gain control functionality in the remote antenna unit with a target level for a pilot tone included in the downstream transport signal;

wherein at least one setting for the automatic gain control functionality in the remote antenna unit is derived from:
a first interpolation between:
a first data point that is associated with a detected level for the at least one pilot tone while the automatic gain control functionality is configured in accordance with a first one of the plurality of entries; and
a second data point that is associated with a detected level for the at least one pilot tone while the automatic gain control functionality is configured in accordance with a second one of the plurality of entries; and
a second interpolation between:
a third data point that is associated with a target level for the at least one pilot tone stored in the first one of the plurality of entries; and
a fourth data point that is associated with a target level for the at least one pilot tone stored in the second one of the plurality of entries.

2. The system of claim 1, wherein the downstream transport signal comprises a first pilot tone and a second pilot tone;
wherein the first data point is associated with detected levels for the first and second pilot tones while the automatic gain control functionality is configured in accordance with the first one of the plurality of entries;
wherein the second data point is associated with detected levels for the first and second pilot tones while the automatic gain control functionality is configured in accordance with the second one of the plurality of entries; and
wherein the third data point is associated with target levels for the first and second pilot tones stored in the first one of the plurality of entries; and
wherein the fourth data point is associated with target levels for the first and second pilot tone stored in the second one of the plurality of entries.

3. The system of claim 2, wherein the first data point is associated with a difference between the detected levels for the first and second pilot tones while the automatic gain control functionality is configured in accordance with the first one of the plurality of entries;
wherein the second data point is associated with a difference between the detected levels for the first and second pilot tones while the automatic gain control functionality is configured in accordance with the second one of the plurality of entries;

wherein the third data point is associated with a difference between the target levels for the first and second pilot tones stored in the first one of the plurality of entries; and
wherein the fourth data point is associated with a difference between the target levels for the first and second pilot tones stored in the second one of the plurality of entries.

4. The system of claim 1, wherein the at least one setting for the automatic gain control functionality in the remote antenna unit is derived by determining an intersection between the first interpolation and the second interpolation.

5. The system of claim 1, wherein the downstream transport signal comprises intermediate frequency versions of the original downstream radio frequency signals.

6. The system of claim 1, wherein the system comprises a plurality of remote antenna units.

7. The system of claim 1, wherein the remote antenna unit comprises a master remote antenna unit that processes the downstream transport signal.

8. The system of claim 1, wherein the remote antenna unit comprises at least one slave unit that produces the downstream radio frequency signal.

9. The system of claim 1, wherein a frequency band specific gain offset is applied to at least one of the at least a subset of the plurality of frequency bands included in the downstream radio frequency signal.

10. The system of claim 9, wherein the frequency band specific gain offset is derived from the first interpolation and the second interpolation.

11. The system of claim 1, wherein the hub unit and the remote antenna unit are a part of an analog distributed antenna system.

12. The system of claim 1, wherein the hub unit and the remote antenna unit are a part of an analog subsystem included in a hybrid digital-analog distributed antenna system.

13. The system of claim 1, wherein each of the plurality of entries is generated at least in part using a measured swept response cascaded with a modeled loss for a medium communicatively coupling the hub unit to the remote antenna unit.

14. The system of claim 13, wherein cascading the measured swept response with the modeled loss for the medium communicatively coupling the hub unit to the remote antenna unit produces a cascade response, wherein a first order least squares fit is performed on the cascade response to derive a closed-from equation to determine an equivalent length for the medium communicatively coupling the hub unit to the remote antenna unit.

15. The system of claim 1, wherein the remote antenna unit is configured to receive an original upstream signal comprising a plurality of upstream frequency bands, each of the plurality of upstream frequency bands associated with a respective radio frequency channel; and
wherein the remote antenna unit is configured to communicate an upstream transport signal from the remote antenna unit to the hub unit;
wherein the hub unit uses the upstream transport signal to generate an upstream signal, wherein the upstream signal comprises at least a subset of the plurality of upstream frequency bands;
wherein the hub unit comprises automatic gain control functionality operable to automatically control at least one of a gain in the hub unit and a slope in the hub unit; and
wherein the hub unit uses a data structure comprising a plurality of upstream entries, each of the upstream entries associating at least one setting for the automatic gain control functionality in the hub unit with a target level for an upstream pilot tone included in the upstream transport signal;

wherein at least one setting for the automatic gain control functionality in the hub unit is derived from:
- a third interpolation between:
  - a fifth data point that is associated with a detected level for the at least one upstream pilot tone while the automatic gain control functionality in the hub unit is configured in accordance with a first one of the plurality of upstream entries; and
  - a sixth data point that is associated with a detected level for the at least one upstream pilot tone while the automatic gain control functionality in the hub unit is configured in accordance with a second one of the plurality of upstream entries; and
- a fourth interpolation between:
  - a seventh data point that is associated with a target level for the at least one upstream pilot tone stored in the first one of the plurality of upstream entries; and
  - an eighth data point that is associated with a target level for the at least one upstream pilot tone stored in the second one of the plurality of upstream entries.

16. A system for distributing a first radio frequency signal comprising a plurality of frequency bands, each of the plurality of frequency bands associated with a respective radio frequency channel, the system comprising:
- a first unit configured to receive a first signal derived from the first radio frequency signal; and
- a second unit that is communicatively coupled to the first unit;
- wherein the first unit is configured to communicate a transport signal from the first unit to the second unit, wherein the transport signal is derived from the first signal received at the first unit;
- wherein the second unit uses the transport signal to generate a second radio frequency signal for radiation from an antenna associated with the second unit, wherein the second radio frequency signal comprises at least a subset of the plurality of frequency bands;
- wherein the second unit comprises automatic gain control functionality operable to automatically control at least one of a gain in the second unit and a slope in the second unit; and
- wherein the second unit uses a data structure comprising a plurality of entries, each of the entries associating at least one setting for the automatic gain control functionality in the second unit with a target level for a pilot tone included in the transport signal;
- wherein at least one setting for the automatic gain control functionality in the second unit is derived from:
  - a first interpolation between:
    - a first data point that is associated with a detected level for the at least one pilot tone while the automatic gain control functionality is configured in accordance with a first one of the plurality of entries; and
    - a second data point that is associated with a detected level for the at least one pilot tone while the automatic gain control functionality is configured in accordance with a second one of the plurality of entries; and
  - a second interpolation between:
    - a third data point that is associated with a target level for the at least one pilot tone stored in the first one of the plurality of entries; and
    - a fourth data point that is associated with a target level for the at least one pilot tone stored in the second one of the plurality of entries.

17. The system of claim 16, wherein the system comprises at least one of a distributed antenna system, repeater, and distributed base station system.

18. A system for distributing a first radio frequency signal comprising a plurality of frequency bands, each of the plurality of frequency bands associated with a respective radio frequency channel, the system comprising:
- a first unit configured to receive the first radio frequency signal from an antenna associated with the first unit;
- a second unit that is communicatively coupled to the first unit;
- wherein the first unit is configured to communicate a transport signal from the first unit to the second unit, wherein the transport signal is derived from the first radio frequency signal received at the first unit;
- wherein the second unit uses the transport signal to generate a second signal for communication to a base station, wherein the second signal comprises at least a subset of the plurality of frequency bands;
- wherein the second unit comprises automatic gain control functionality operable to automatically control at least one of a gain in the second unit and a slope in the second unit; and
- wherein the second unit uses a data structure comprising a plurality of entries, each of the entries associating at least one setting for the automatic gain control functionality in the second unit with a target level for a pilot tone included in the transport signal;
- wherein at least one setting for the automatic gain control functionality in the second unit is derived from:
  - a first interpolation between:
    - a first data point that is associated with a detected level for the at least one pilot tone while the automatic gain control functionality is configured in accordance with a first one of the plurality of entries; and
    - a second data point that is associated with a detected level for the at least one pilot tone while the automatic gain control functionality is configured in accordance with a second one of the plurality of entries; and
  - a second interpolation between:
    - a third data point that is associated with a target level for the at least one pilot tone stored in the first one of the plurality of entries; and
    - a fourth data point that is associated with a target level for the at least one pilot tone stored in the second one of the plurality of entries.

19. The system of claim 18, wherein the system comprises at least one of a distributed antenna system, repeater, and distributed base station system.

20. A method of characterizing a signal path in a system operable to distribute radio frequency signals having a plurality of frequency bands, the method comprising:
- sweeping a signal through a frequency range that includes the plurality of frequency bands;
- measuring a corresponding swept response;
- calculating an equivalent length for a communication medium associated with the system based on the swept response;
- adjusting a gain setting based on the equivalent length; and
- storing at least one setting associated with the signal path for use in configuring the system.

21. The method of claim 20, wherein the system comprises at least one of a distributed antenna system, repeater, and distributed base station system.

22. The method of claim 20, wherein the signal path being characterized includes at least one of automatic gain control functionality, pilot tone functionality, and band-specific gain adjustment functionality.

23. The method of claim 20, wherein the at least one setting associated with the signal path comprises at least one of:
- a gain setting;
- a slope setting;
- a gain offset for at least one of the plurality of frequency bands; and
- a level for a pilot tone.

24. The method of claim 20, wherein the equivalent length is calculated based on a closed form equation derived from a least squares fit function based on a measured swept response cascaded with a modeled loss for the medium associated with the system.

* * * * *